United States Patent
Guo et al.

(10) Patent No.: US 12,543,063 B2
(45) Date of Patent: Feb. 3, 2026

(54) SIDELINK INTERFERENCE MONITORING FOR FULL-DUPLEX AND HALF-DUPLEX OPERATION

(71) Applicant: QUALCOMM Incorporated, San Diego, CA (US)

(72) Inventors: Hui Guo, Beijing (CN); Kapil Gulati, Belle Mead, NJ (US); Min Huang, Beijing (CN); Tien Viet Nguyen, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 470 days.

(21) Appl. No.: 17/995,982

(22) PCT Filed: May 23, 2020

(86) PCT No.: PCT/CN2020/091955
§ 371 (c)(1),
(2) Date: Oct. 11, 2022

(87) PCT Pub. No.: WO2021/237385
PCT Pub. Date: Dec. 2, 2021

(65) Prior Publication Data
US 2023/0217290 A1    Jul. 6, 2023

(51) Int. Cl.
*H04W 24/10* (2009.01)
*H04B 17/336* (2015.01)
*H04L 5/14* (2006.01)

(52) U.S. Cl.
CPC .......... *H04W 24/10* (2013.01); *H04B 17/336* (2015.01); *H04L 5/14* (2013.01)

(58) Field of Classification Search
CPC .. H04W 24/10; H04W 72/541; H04B 17/336; H04L 5/14
See application file for complete search history.

(56) References Cited

U.S. PATENT DOCUMENTS

2009/0213765 A1* 8/2009 Rinne .................. H04B 1/56
370/278
2017/0054544 A1 2/2017 Kazmi et al.
(Continued)

FOREIGN PATENT DOCUMENTS

CN 101151812 A 3/2008
CN 103109490 A 5/2013
(Continued)

OTHER PUBLICATIONS

CATT: "Interference Management for Dynamic TDD and Flexible Duplex," R1-1608790, 3GPP TSG RAN WG1 Meeting #86bis, Oct. 10-14, 2016 (Oct. 10 2016), the whole document, 3 pages.
(Continued)

*Primary Examiner* — Gary Mui
*Assistant Examiner* — Yewon Kim
(74) *Attorney, Agent, or Firm* — Holland & Hart LLP /QUALCOMM Incorporated

(57) ABSTRACT

Methods, systems, and devices for wireless communications are described. Generally, the described techniques at a user equipment (UE) provide for efficiently falling back to a half-duplex mode from a full-duplex mode when a level of interference is high. In particular, the UE may measure the level of interference at the UE (e.g., caused at least partially by self-interference between transmissions and receptions at the UE), and the UE may fall back to a half-duplex mode if the level of interference is above a threshold. In one example, the UE may transmit channel state information (CSI) reference signals (CSI-RSs) on resources allocated for interference measurements, and the UE may perform measurements on the CSI-RSs to identify a level of interference. In another example, the UE may transmit a data packet on resources allocated for interference measurements, and the UE may decode the data packet to identify a level of interference.

34 Claims, 16 Drawing Sheets

(56) References Cited

U.S. PATENT DOCUMENTS

| | | | |
|---|---|---|---|
| 2017/0170946 A1 | 6/2017 | Min et al. | |
| 2018/0212746 A1* | 7/2018 | Kazmi | H04L 5/14 |
| 2019/0335407 A1 | 10/2019 | Lee et al. | |
| 2021/0143895 A1* | 5/2021 | Kim | H04W 4/40 |
| 2022/0338170 A1* | 10/2022 | Abotabl | H04W 72/0446 |

FOREIGN PATENT DOCUMENTS

| | | |
|---|---|---|
| CN | 105934893 B | 10/2019 |
| CN | 110582951 A | 12/2019 |
| WO | WO-2018058455 A1 | 4/2018 |
| WO | WO-2018084782 A1 | 5/2018 |
| WO | WO-2020033609 A1 | 2/2020 |

OTHER PUBLICATIONS

Huawei, et al., "Coexistence Issue Between Sidelink and Uu Interface in Licensed," R4-1903178, 3GPP TSG-RAN WG4 Meeting #90bis, Apr. 8-12, 2018 (Apr. 12, 2018), the whole document, 3 pages.

International Search Report and Written Opinion—PCT/CN2020/091955—ISA/EPO—Feb. 23, 2021.

Supplementary European Search Report—EP20937946—Search Authority—The Hague—Jan. 9, 2024.

\* cited by examiner

SIDELINK INTERFERENCE MONITORING FOR FULL-DUPLEX AND HALF-DUPLEX OPERATION

CROSS REFERENCE

The present application is a 371 national stage filing of International PCT Application No. PCT/CN2020/091955 by Guo et al. entitled "SIDELINK INTERFERENCE MONITORING FOR FULL-DUPLEX AND HALF-DUPLEX OPERATION," filed May 23, 2020, which is assigned to the assignee hereof, and which is expressly incorporated by reference in its entirety herein.

INTRODUCTION

The following relates generally to wireless communications and more specifically to managing interference for sidelink communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

A method of wireless communication at a UE is described. The method may include transmitting on resources allocated for interference measurements at the UE, where the UE is operating in a full-duplex mode for sidelink communications, determining that a level of interference between transmissions and receptions at the UE satisfies an interference threshold based on the transmitting, and switching to a half-duplex mode for sidelink communications based on the determining.

An apparatus for wireless communication at a UE is described. The apparatus may include a processor and memory coupled to the processor. The processor and memory may be configured to transmit on resources allocated for interference measurements at the UE, where the UE is operating in a full-duplex mode for sidelink communications, determine that a level of interference between transmissions and receptions at the UE satisfies an interference threshold based on the transmitting, and switch to a half-duplex mode for sidelink communications based on the determining.

Another apparatus for wireless communication at a UE is described. The apparatus may include means for transmitting on resources allocated for interference measurements at the UE, where the UE is operating in a full-duplex mode for sidelink communications, determining that a level of interference between transmissions and receptions at the UE satisfies an interference threshold based on the transmitting, and switching to a half-duplex mode for sidelink communications based on the determining.

A non-transitory computer-readable medium storing code for wireless communication at a UE is described. The code may include instructions executable by a processor to transmit on resources allocated for interference measurements at the UE, where the UE is operating in a full-duplex mode for sidelink communications, determine that a level of interference between transmissions and receptions at the UE satisfies an interference threshold based on the transmitting, and switch to a half-duplex mode for sidelink communications based on the determining.

In some examples of the method, apparatuses, and non-transitory computer-readable medium described herein, transmitting on resources allocated for interference measurements may include operations, features, means, or instructions for transmitting channel state information reference signals on the resources allocated for interference measurements, where the interference measurements include channel state information interference measurements. Some examples of the method, apparatuses, and non-transitory computer-readable medium described herein may further include operations, features, means, or instructions for performing at least one measurement on the resources allocated for interference measurements, where determining that the level of interference satisfies the interference threshold may be based on performing the at least one measurement.

Some examples of the method, apparatuses, and non-transitory computer-readable medium described herein may further include operations, features, means, or instructions for comparing the at least one measurement to the interference threshold, where determining that the level of interference satisfies the interference threshold includes determining that the at least one measurement satisfies the interference threshold (e.g., or fails to satisfy the interference threshold). Some examples of the method, apparatuses, and non-transitory computer-readable medium described herein may further include operations, features, means, or instructions for mapping the at least one measurement to a block error rate, and comparing the block error rate to the interference threshold, where determining that the level of interference satisfies the interference threshold includes determining that the block error rate satisfies the interference threshold.

In some examples of the method, apparatuses, and non-transitory computer-readable medium described herein, transmitting on resources allocated for interference measurements may include operations, features, means, or instructions for transmitting a data packet on the resources allocated for interference measurements. Some examples of the method, apparatuses, and non-transitory computer-readable medium described herein may further include operations, features, means, or instructions for decoding the data packet, where determining that the level of interference satisfies the interference threshold may be based on decoding the data packet.

Some examples of the method, apparatuses, and non-transitory computer-readable medium described herein may further include operations, features, means, or instructions for sending an out-of-sync indication from a lower layer at the UE to an upper layer at the UE each time the UE determines that the level of interference between transmissions and receptions at the UE satisfies the interference threshold. Some examples of the method, apparatuses, and non-transitory computer-readable medium described herein may further include operations, features, means, or instructions for switching to the half-duplex mode for sidelink communications may be based on the upper layer at the UE receiving a threshold number of consecutive out-of-sync indications.

Some examples of the method, apparatuses, and non-transitory computer-readable medium described herein may further include operations, features, means, or instructions for sending in-sync indications from a lower layer at the UE to an upper layer at the UE each time the UE determines that the level of interference between transmissions and receptions at the UE fails to satisfy the interference threshold. Some examples of the method, apparatuses, and non-transitory computer-readable medium described herein may further include operations, features, means, or instructions for switching back to the full-duplex mode for sidelink communications based on the upper layer at the UE receiving a threshold number of consecutive in-sync indications.

In some examples of the method, apparatuses, and non-transitory computer-readable medium described herein, the UE may include operations, features, means, or instructions for transmitting, to a second UE after switching to the half-duplex mode, an indication that the first UE may be operating in the half-duplex mode for sidelink communications. In some examples of the method, apparatuses, and non-transitory computer-readable medium described herein, the UE may include operations, features, means, or instructions for receiving, from a second UE, an indication of whether the second UE may be operating in the full-duplex mode or the half-duplex mode for sidelink communications, and scheduling sidelink communications with the second UE based on whether the second UE may be operating in the full-duplex mode or the half-duplex mode.

In some examples of the method, apparatuses, and non-transitory computer-readable medium described herein, the UE may include operations, features, means, or instructions for transmitting, to a second UE, an indication of a slot pattern used by the first UE for sidelink communications. In some examples of the method, apparatuses, and non-transitory computer-readable medium described herein, the UE may include operations, features, means, or instructions for receiving, from a second UE, an indication of a slot pattern used by the second UE for sidelink communications, and scheduling sidelink communications with the second UE based on the slot pattern used by the second UE for sidelink communications.

Some examples of the method, apparatuses, and non-transitory computer-readable medium described herein may further include operations, features, means, or instructions for transmitting, to a base station, a request to operate in the half-duplex mode based on the level of interference satisfying the interference threshold, and receiving a reconfiguration message from the base station configuring the UE to operate in the half-duplex mode, where falling back to the half-duplex mode for sidelink communications may be based on receiving the reconfiguration message. In some examples of the method, apparatuses, and non-transitory computer-readable medium described herein, the UE may include operations, features, means, or instructions for forwarding, to a base station, a channel state information report received from a second UE, and receiving, from the base station, an indication of whether to operate in the full-duplex mode or the half-duplex mode for sidelink communications based on forwarding the channel state information report.

Some examples of the method, apparatuses, and non-transitory computer-readable medium described herein may further include operations, features, means, or instructions for receiving a control message from a base station indicating the resources allocated for interference measurements. In some examples of the method, apparatuses, and non-transitory computer-readable medium described herein, the resources allocated for interference measurements may be periodic. Some examples of the method, apparatuses, and non-transitory computer-readable medium described herein may further include operations, features, means, or instructions for operating in full-duplex mode includes simultaneously transmitting and receiving on a same set of time and frequency resources, and where operating in half-duplex mode includes either transmitting or receiving on a set of time and frequency resources.

A method of wireless communication at a base station is described. The method may include transmitting, to a first UE, a control message indicating resources allocated for interference measurements, identifying whether the first UE is operating in a full-duplex mode or a half-duplex mode for sidelink communications based on transmitting the control message, and scheduling sidelink communications between the first UE and a second UE based on the identifying.

An apparatus for wireless communication at a base station is described. The apparatus may include a processor and memory coupled to the processor. The processor and memory may be configured to transmit, to a first UE, a control message indicating resources allocated for interference measurements, identify whether the first UE is operating in a full-duplex mode or a half-duplex mode for sidelink communications based on transmitting the control message, and schedule sidelink communications between the first UE and a second UE based on the identifying.

Another apparatus for wireless communication at a base station is described. The apparatus may include means for transmitting, to a first UE, a control message indicating resources allocated for interference measurements, identifying whether the first UE is operating in a full-duplex mode or a half-duplex mode for sidelink communications based on transmitting the control message, and scheduling sidelink communications between the first UE and a second UE based on the identifying.

A non-transitory computer-readable medium storing code for wireless communication at a base station is described. The code may include instructions executable by a processor to transmit, to a first UE, a control message indicating resources allocated for interference measurements, identify whether the first UE is operating in a full-duplex mode or a half-duplex mode for sidelink communications based on transmitting the control message, and schedule sidelink communications between the first UE and a second UE based on the identifying.

Some examples of the method, apparatuses, and non-transitory computer-readable medium described herein may further include operations, features, means, or instructions for receiving, from the first UE, a request to operate in a full-duplex mode or a half-duplex mode, and transmitting, to the first UE, a reconfiguration message configuring the UE to operate in the full-duplex mode or the half-duplex mode, where identifying whether the first UE may be operating in the full-duplex mode or the half-duplex mode for sidelink communications may be based on transmitting the reconfiguration message. Some examples of the method, apparatuses, and non-transitory computer-readable medium described herein may further include operations, features, means, or instructions for receiving, from the first UE, a channel state information report forwarded from the second UE, and transmitting, to the first UE, an indication of whether to operate in the full-duplex mode or the half-duplex mode for sidelink communications based on the channel state information report, where identifying whether the first UE may be operating in the full-duplex mode or the half-duplex mode for sidelink communications may be based on transmitting the indication. In some examples of the method, apparatuses, and non-transitory computer-readable medium described herein, the resources allocated for interference measurements may be periodic.

DETAILED DESCRIPTION

Some wireless communications systems may support sidelink communications between UEs. A UE supporting sidelink communications may be referred to as a sidelink UE. In such systems, a sidelink UE may have the capability to communicate in a half-duplex mode and a full-duplex mode. The half-duplex mode may support one-way communication via transmission or reception, but not transmission and reception simultaneously. Alternatively, the full-duplex mode may support two-way communication via simultaneous transmission and reception on the same time-frequency resources. In some cases, when communicating in a full-duplex mode, a sidelink UE may experience self-interference. Self-interference may refer to interference between transmissions from the UE and receptions at the UE (e.g., between transmitted and received signals). In such cases, if the self-interference is above a threshold, the UE may be unable to decode sidelink data received from other UEs or downlink data received from a base station, resulting in reduced throughput in a wireless communications system.

As described herein, a UE may support efficient techniques for falling back to a half-duplex mode from a full-duplex mode when a level of interference is high. In particular, the UE may measure the level of interference at the UE (e.g., caused at least partially by self-interference between transmissions and receptions at the UE), and the UE may fall back to a half-duplex mode if the level of interference is above a threshold. In one example, the UE may transmit channel state information (CSI) reference signals (CSI-RSs) on resources allocated for interference measurements, and the UE may perform measurements on the CSI-RSs. The UE may then identify a level of interference based on the measurements performed on the resources allocated for interference measurements. In another example, the UE may transmit a data packet on resources allocated for interference measurements, and the UE may decode the data packet to identify a level of interference.

Aspects of the disclosure introduced above are described below in the context of a wireless communications system. Examples of processes and signaling exchanges that support sidelink interference monitoring for full-duplex and half-duplex operation are then described. Aspects of the disclosure are further illustrated by and described with reference to apparatus diagrams, system diagrams, and flowcharts that relate to sidelink interference monitoring for full-duplex and half-duplex operation.

Figure 1:
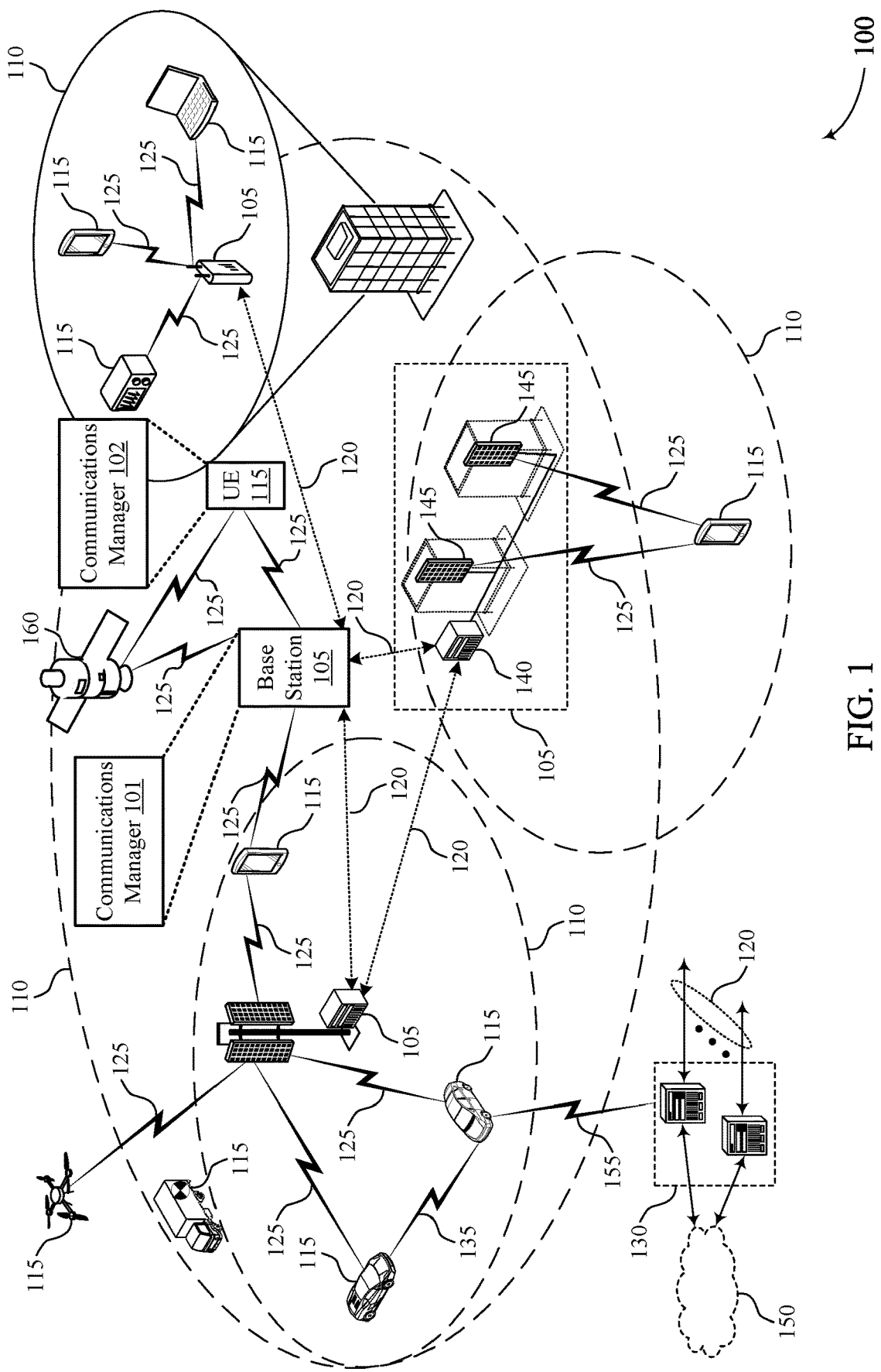
FIG. 1 illustrates an example of a wireless communications system that supports sidelink interference monitoring for full-duplex and half-duplex operation in accordance with aspects of the present disclosure.

FIG. 1 illustrates an example of a wireless communications system 100 that supports sidelink interference monitoring for full-duplex and half-duplex operation in accordance with aspects of the present disclosure. The wireless communications system 100 may include one or more base stations 105, one or more UEs 115, and a core network 130. In some examples, the wireless communications system 100 may be an LTE network, an LTE-A network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

A UE 115 may include a communications manager 102. The communications manager 102 may transmit on resources allocated for interference measurements at the UE, wherein the UE is operating in a full-duplex mode for sidelink communications, determine that a level of interference between transmissions and receptions at the UE satisfies an interference threshold based at least in part on the transmitting, and switch to a half-duplex mode for sidelink communications based at least in part on the determining.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A base station 105 may include a communications manager 101. The communications manager 101 at the base station 105 may transmit, to a first UE, a control message indicating resources allocated for interference measurements, identify whether the first UE is operating in a full-duplex mode or a half-duplex mode for sidelink communications based at least in part on transmitting the control message, and schedule sidelink communications between the first UE and a second UE based at least in part on the identifying.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

The communication links 125 shown in the wireless communications system 100 may include uplink transmissions from a UE 115 to a base station 105 (e.g., in a physical uplink shared channel (PUSCH) or a physical uplink control channel (PUCCH)), or downlink transmissions from a base station 105 to a UE 115 (e.g., in a physical downlink shared channel (PDSCH) or a physical downlink control channel (PDCCH)). Carriers may carry downlink or uplink communications (e.g., in an FDD mode) or may be configured to carry downlink and uplink communications (e.g., in a TDD mode).

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

Some UEs 115 in wireless communications system 100 may be configured to employ operating modes that reduce power consumption, such as a half-duplex mode. A half-duplex mode may refer to a mode that supports one-way communication via transmission or reception, but not transmission and reception simultaneously. In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

In addition to, or as an alternative to, a half-duplex mode, some UEs 115 may support a full-duplex mode. A full-duplex mode may refer to a mode that supports two-way communication via simultaneous transmission and reception. The full-duplex mode is an emerging technique which is capable of theoretically doubling link capacity by enabling radio network nodes to transmit and receive simultaneously on the same frequency and time radio resource. Full-duplex breaks half-duplex operation constraints where transmission and reception either differ in time or in frequency. A full-duplex network node, such as a base station 105 or UE 115 in the cellular network, can communicate simultaneously in uplink and downlink with two half-duplex panels using the same radio resources. Thus, a UE 115 (e.g., a vehicle in V2X communications) equipped with multiple TRPs that owns the capability of simultaneous transmission and reception using the same time-frequency radio resource may be referred to as a full-duplex capable UE. The UE 115 may also be capable of working in both the full-duplex mode and backing off to a half-duplex mode.

In some cases, a UE 115 in wireless communications system 100 may be able to communicate directly with other UEs 115 over a sidelink connection (e.g., using a peer-to-peer (P2P) or device-to-device (D2D) protocol). Such communications may be referred to as D2D or sidelink communications. One or more of a group of UEs 115 utilizing sidelink communications may be within the geographic coverage area 110 of a base station 105. In some cases, other UEs 115 in such a group may be outside the geographic coverage area 110 of the base station 105 or may be otherwise unable to receive transmissions from the base station 105. In such cases, the UEs 115 within the geographic coverage 110 of the base station 105 may relay communications between the base station 105 and the UEs 115 outside the geographic area 110 of the base station 105. UEs 115 communicating via sidelink communications may utilize a one-to-many (1:M) system in which each UE 115 transmits to every other UE 115 in the group.

Figure 2:
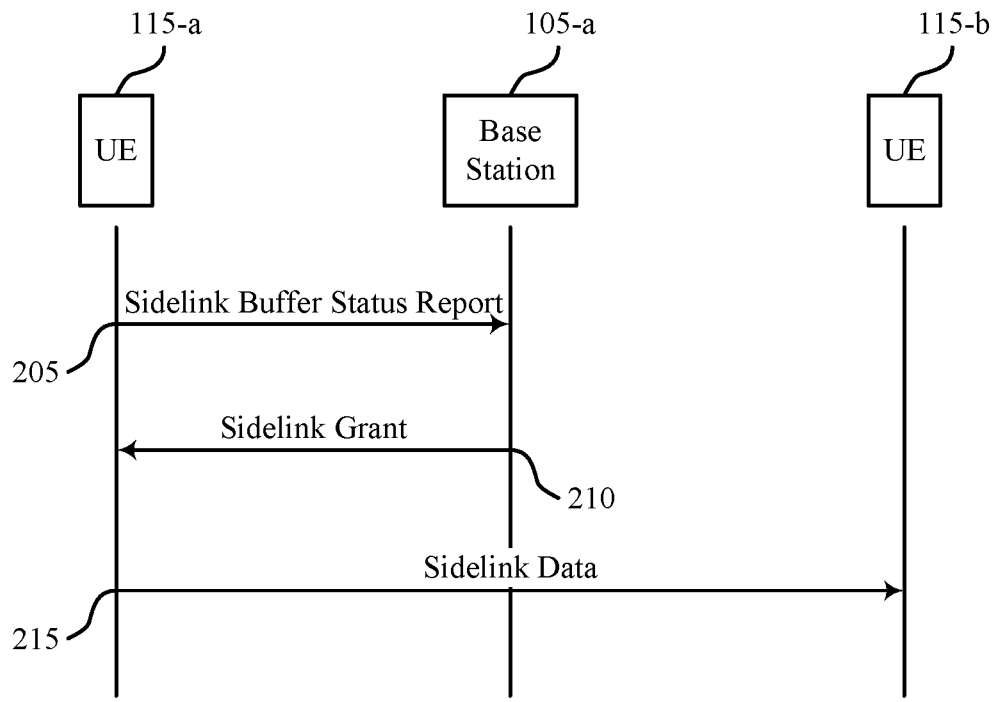
FIGS. 2 and 3 illustrate examples of process flows showing the scheduling of sidelink communications in accordance with aspects of the present disclosure.

FIG. 2 illustrates an example of a process flow 200 showing the scheduling of sidelink communications by a base station 105-a in accordance with aspects of the present disclosure. In the example of FIG. 2, the base station 105-a may facilitate the scheduling of resources for sidelink communications. The scheduling of sidelink communications by the base station 105-*a* may be referred to as resource allocation mode 1. That is, the base station 105-*a* may allocate resources for sidelink communications between UEs 115. At 205, a first UE 115-*a* may transmit a sidelink buffer status report (BSR) to the base station 105-*a*. The sidelink BSR may indicate that the UE 115-*a* has sidelink data to transmit to a second UE 115-*b*. At 210, the base station 105-*a* may transmit a sidelink grant to the first UE 115-*a* to schedule resources for the first UE 115-*a* to use to transmit sidelink data to the second UE 115-*b*. Thus, at 215, the first UE 115-*a* may transmit the sidelink data to the second UE 115-*b* on the scheduled resources. Although a base station 105 may schedule sidelink resources for a UE 115 (e.g., the first UE 115-*a*) upon receiving a sidelink BSR from the UE 115, the base station 105 may be ignorant of the one or more receiving UEs 115 (e.g., the second UE 115-*a*) of the corresponding transmission on the scheduled resources.

Figure 3:
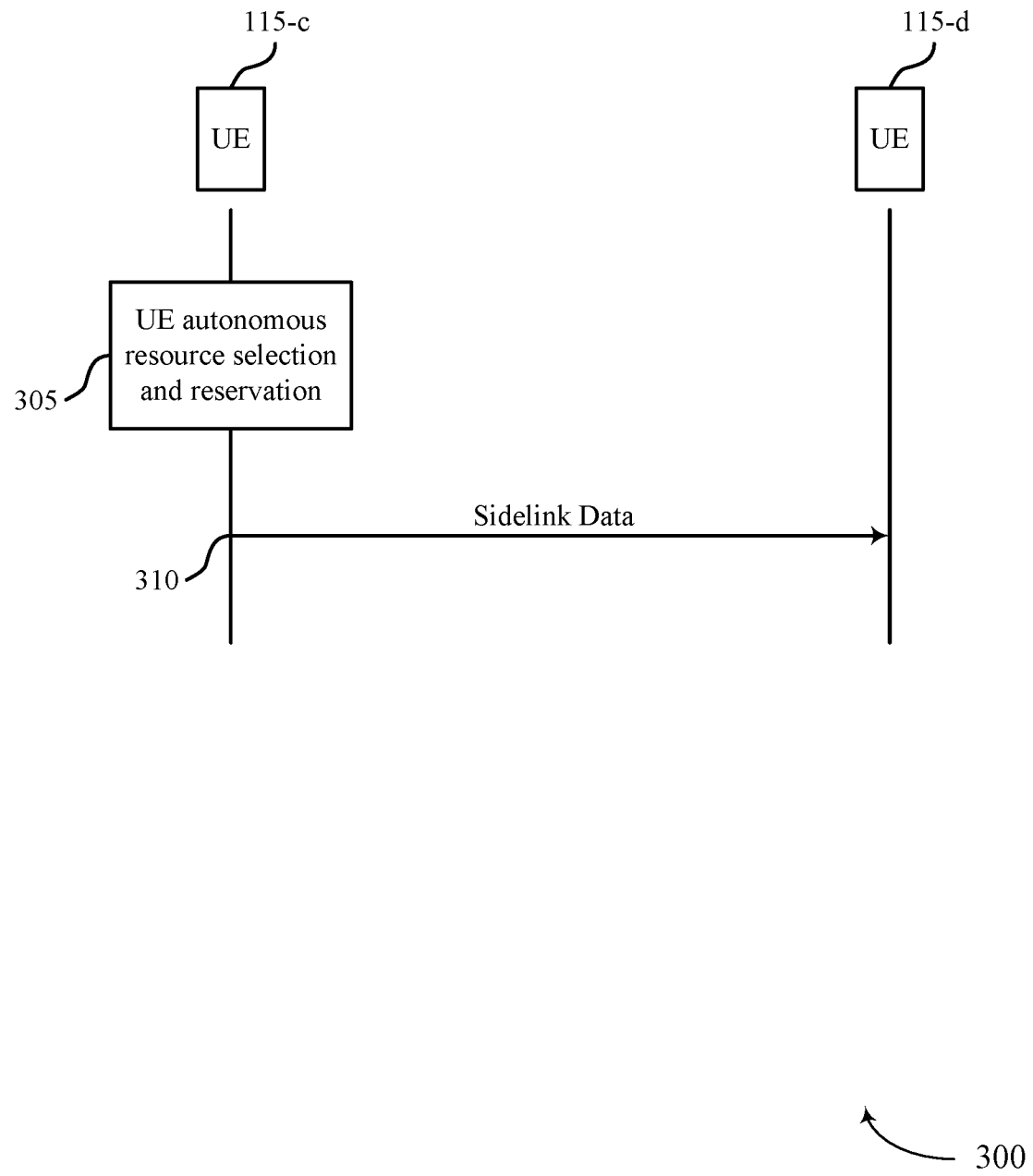

FIG. 3 illustrates an example of a process flow 300 showing sidelink communications carried out between UEs 115 without the involvement of a base station 105. The scheduling of sidelink communications by a UE 115 without the involvement of a base station 105 may be referred to as resource allocation mode 2. That is, a first UE 115-*c* may identify resources for sidelink communications with a second UE 115-*d* without the involvement of a base station 105. At 305, the first UE 115-*c* may autonomously select and reserve resources for transmitting sidelink data to the second UE 115-*d*. At 310, the first UE 115-*c* may then transmit the sidelink data to the second UE 115-*d* on the reserved resources. In both FIG. 2 and FIG. 3, the first UE 115 may transmit the sidelink data on a physical sidelink shared channel (PSSCH). Additionally, sidelink communications may include discovery expression transmissions on a physical sidelink discovery channel (PSDCH) (e.g., to allow proximal devices to discover each other's presence). Sidelink communications may also include control information transmissions on a physical sidelink control channel (PSCCH) and feedback transmissions on a physical sidelink feedback channel (PSFCH).

According to some aspects, sidelink communications may include communications between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

Figure 4:
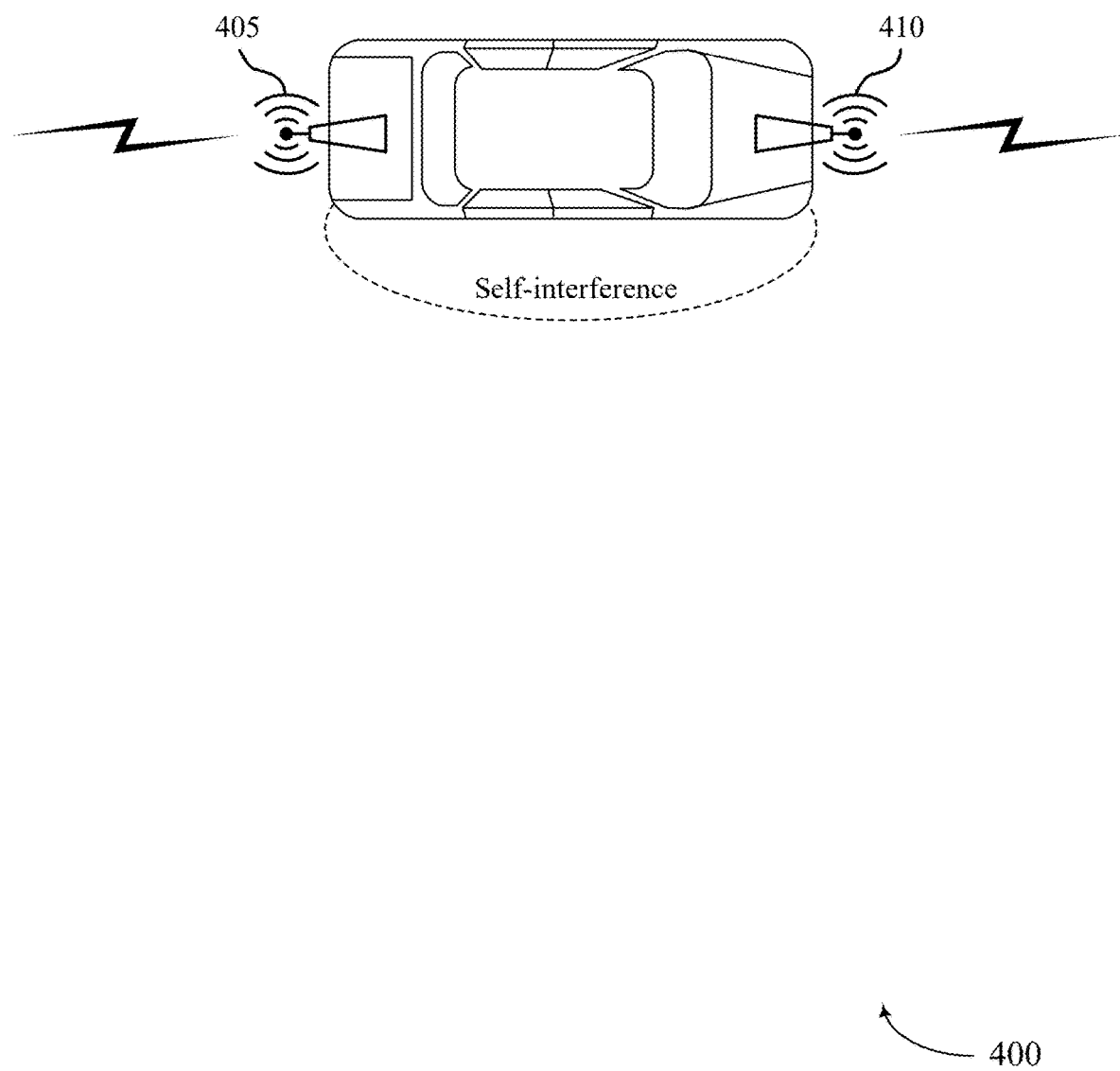
FIG. 4 illustrates an example of a vehicle supporting sidelink communications in accordance with aspects of the present disclosure.

FIG. 4 illustrates an example of a vehicle 400 supporting sidelink communications in accordance with aspects of the present disclosure. The vehicle 400 may be capable of communicating in a half-duplex mode and a full-duplex mode (e.g., a full-duplex capable vehicle). When communicating in a full-duplex mode, the vehicle 400 may experience self-interference. Self-interference may refer to interference between transmissions at the vehicle 400 and receptions at the vehicle 400 (e.g., between transmitted and received signals at the vehicle 400). Thus, the vehicle 400 may be equipped with at least two TRPs (e.g., a transmitter 405 and a receiver 410) located at different parts of the vehicle 400 to reduce the self-interference and achieve better coverage. In some cases, however, although the TRPs may be located at different parts of the vehicle 400, the vehicle 400 may still experience high self-interference. In addition, the vehicle 400 may experience cluster interference from surrounding objects. Cluster interference may refer to interference from nearby objects or devices forming a cluster.

In some aspects, due to high interference (e.g., caused by self-interference compounded with cluster interference), the full-duplex capable vehicle 400 may not always function efficiently in the full-duplex mode. That is, the high interference may lead to a reduced signal-to-interference-plus-noise ratio (SINR) and may result in reduced throughput in a wireless communications system. Further, although FIG. 4 illustrates an example of a vehicle 400, the vehicle 400 may be an example of a UE 115 and may represent any UE 115 experiencing self-interference and cluster interference leading to reduced throughput. A UE 115 in wireless communications system 100 may support efficient techniques for falling back to a half-duplex mode from a full-duplex mode when self-interference at the UE 115 is high. Interference measurement may be key for link-quality monitoring. That is, with a high level of interference, a full-duplex capable UE 115 may not always work in a full-duplex mode. Instead, the UE 115 may fall back to a half-duplex mode when certain conditions for the level of interference are satisfied. Due to different product designs and hardware and software implementations, the capabilities of mitigating full-duplex interference for each full-duplex capable UE 115 may be different.

Figure 5:
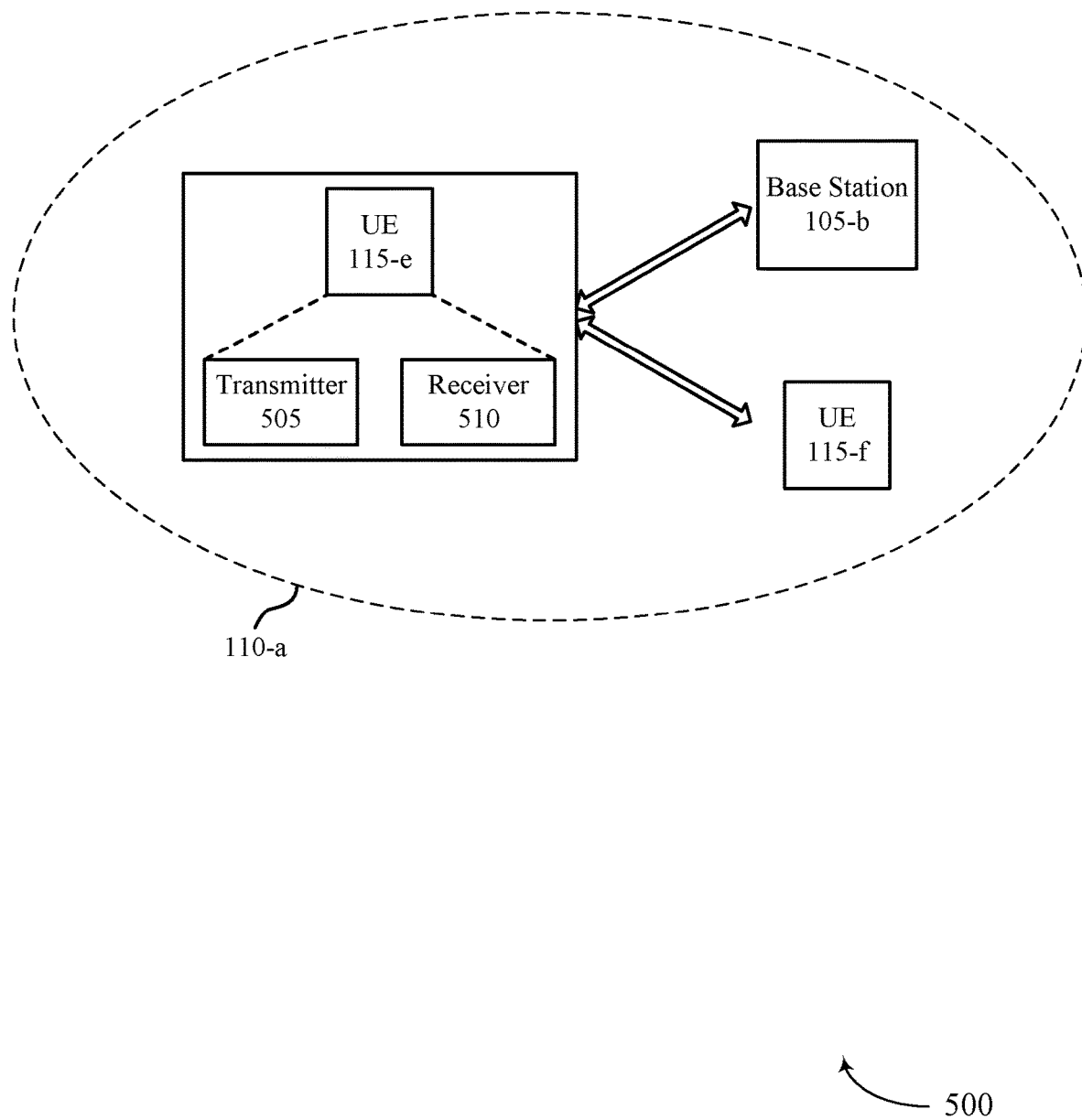
FIG. 5 illustrates an example of a wireless communications system that supports sidelink interference monitoring for full-duplex and half-duplex operation in accordance with aspects of the present disclosure.

FIG. 5 illustrates an example of a wireless communications system 500 that supports sidelink interference monitoring for full-duplex and half-duplex operation in accordance with aspects of the present disclosure. The wireless communications system 500 includes a UE 115-*e* and a UE 115-*f*, which may be examples of sidelink UEs 115 described with reference to FIGS. 1-4. The wireless communications system 500 also includes a base station 105-*b*, which may be an example of a base station 105 described with reference to FIGS. 1-4. Base station 105-*b* may provide communications coverage for geographic coverage area 110-*a*, which may be an example of a geographic coverage area 110 described with reference to FIG. 1. The wireless communications system 500 may implement aspects of wireless communications system 100. For example, the UE 115-*e* in wireless communications system 500 may support efficient techniques for falling back to a half-duplex mode from a full-duplex mode when a level of interference at the UE 115-*e* is high.

In the example of FIG. 5, the UE 115-*e* may monitor the level of interference at the UE 115-*e* which may be caused by self-interference between the transmitter 505 and the receiver 510 at the UE 115-*e*. The UE 115-*e* may identify resources allocated for interference measurements and the UE 115-*e* may transmit on these resources. The UE 115-*e* may then perform measurements on the resources to determine a level of self-interference. In some cases, the base station 105-*b* may allocate the resources for interference measurements (e.g., in resource allocation mode 1). That is, the UE 115-*e* may receive a control message from the base station 105-*b* allocating the resources for interference measurements. In other cases, the UE 115-*e* may autonomously identify the resources for interference measurements (e.g., without the involvement of the base station 105-*b*).

The UE 115-*e* may then perform measurements on the resources allocated for interference measurements, and the UE 115-*e* may compare the measurements to one or more thresholds to determine if a level of self-interference is too high. If the level of self-interference is too high, the UE 115-*e* may fall back to a half-duplex mode for sidelink communications. That is, because the interference mitigation performance may be impacted by communication entities of both the transmit-side and the receive-side at the UE 115-*e*, and link quality could be quite poor if self-interference or clutter interference due to full-duplex communications is high, it may be appropriate to support a procedure where the full-duplex capable UE 115-*e* triggers a fallback to a half-duplex mode if certain conditions are satisfied.

In some aspects, the transmitter 505 at the UE 115-*e* may transmit CSI-RSs on the resources allocated for interference measurements. In this example, the resources allocated for interference measurements may be referred to as CSI interference measurements (CSI-IM) resources. In resource allocation mode 1, where the base station 105-*b* schedules resources for sidelink communications, the base station 105-*b* may reserve periodic time-frequency resource pools to allow full-duplex capable UEs 115 to conduct full-duplex interference measurement. While the transmitter 505 at the UE 115-*e* transmits the CSI-RSs, the receiver 510 at the UE 115-*e* may receive CSI-RSs from the UE 115-*f*. The UE 115-*e* may then perform one or more measurements on the CSI-IM resources to determine the level of interference at the UE 115-*e* (e.g., caused at least partially by self-interference between the transmitter 505 and the receiver 510)). For example, the UE 115-*e* may measure the SINR, reference signal received power (RSRP), or reference signal received quality (RSRQ) of the CSI-RSs received on the resources allocated for interference measurements.

The one or more measurements may correspond to the level of self-interference. In one example, the UE 115-*e* may compare at least one measurement to a threshold to determine whether the self-interference is too high. For instance, the decision of whether to fall back to a half-duplex mode may be based on comparing interference measurements to one or more predefined thresholds. If the measurement indicates that the level of interference satisfies an interference threshold (e.g., RSRP, RSRQ, or SINR is below a threshold), the UE 115-*e* may fall back to a half-duplex mode for sidelink communications (e.g., since the UE 115-*e* may determine that the level of interference is too high to support full-duplex communications). Alternatively, if the measurement indicates that the level of interference is below the interference threshold, the UE 115-*e* may continue operating in a full-duplex mode. In another example, the UE 115-*e* may map the measurement (e.g., RSRP) to a block error rate (BLER), and the UE 115-*e* may compare the BLER to a threshold. If the BLER is equal to or greater than the threshold (e.g., the level of interference satisfies the interference threshold), the UE 115-*e* may fall back to a half-duplex mode for sidelink communications. Alternatively, if the BLER is below the threshold, the UE 115-*e* may continue operating in a full-duplex mode.

In other aspects, the transmitter 505 at the UE 115-*e* may transmit a data packet on the resources allocated for interference measurements. In some cases, the UE 115-*e* may periodically transmit data packets on resources allocated for interference measurements. For example, a periodic data packet may be triggered by a high layer at the UE 115-*e* in order for the full-duplex UE 115-*e* to conduct full-duplex measurements. The UE 115-*e* may send and decode the data packet at the same time, so that the radio link condition and self-interference caused by full-duplex communications may be monitored periodically. That is, the UE 115-*e* may decode the data packet and determine the level of interference at the UE 115-*e* caused by transmitting the data packet. The data packet may be specifically designed for the full-duplex capable UE 115-*e* to conduct sidelink channel state monitoring. For example, the data packet may have a limited transport block size and a low coding rate so that the UE 115-*e* may decode the data packet successfully (e.g., even at relatively high interference levels). If the UE 115-*e* is unable to decode the data packet or if the quality of the decoded data packet is below a threshold, the UE 115-*e* may fall back to a half-duplex mode for sidelink communications (e.g., since the UE 115-*e* may determine that the level of interference is too high to support full-duplex communications). Alternatively, if the UE 115-*e* is able to decode the data packet or the quality of the decoded data packet is equal to or above a threshold, the UE 115-*e* may continue operating in a full-duplex mode.

In some cases (e.g., in resource allocation mode 2), to allow for efficient scheduling of sidelink communications between the UE 115-*e* and the UE 115-*f*, the UE 115-*e* may inform the UE 115-*f* of the mode in which the UE 115-*e* is operating, and the UE 115-*f* may inform the UE 115-*e* of the mode in which the UE 115-*f* is operating. That is, a sidelink UE 115 may inform one or more other sidelink UEs 115 of the mode in which the sidelink UE 115 is operating. For instance, after switching to the half-duplex mode, the UE 115-*e* may transmit an indication to the UE 115-*f* that the UE 115-*e* is operating in the half-duplex mode for sidelink communications. In such cases, the UE 115-*f* may schedule communications with the UE 115-*e* based on the UE 115-*e* operating in the half-duplex mode. In particular, the UE 115-*f* may avoid scheduling a transmission to the UE 115-*e* on resources used by the UE 115-*e* to transmit to the UE 115-*f* (i.e., avoid scheduling the UE 115-*e* for full-duplex communications).

A sidelink UE 115 may also inform one or more other sidelink UEs 115 of whether the sidelink UE 115 is capable of full-duplex communications (e.g., full-duplex capability) and whether the sidelink UE 115 is capable of falling back to a half-duplex mode (e.g., half-duplex fallback capability). For example, the full-duplex capability and half-duplex fallback capability may be capabilities of a UE 115 in sidelink communications, and the sidelink UE 115 may indicate the full-duplex capability, the half-duplex fallback capability, or both as UE capabilities. Thus, the full-duplex capability, half-duplex fallback capability, or duplex mode may be shared among sidelink communication entities for better resource allocation. In one case, the UE 115-*e* may unicast full-duplex and half-duplex fallback capabilities to the UE 115-*f* (e.g., in a MAC control element (MAC-CE) or RRC signaling). Further, the UE 115-*e* may also indicate a slot pattern (e.g., in sidelink control information (SCI), a MAC-CE, or RRC signaling) to the UE 115-*f* such that the UE 115-*f* may appropriately schedule sidelink communications with the UE 115-*e*. That is, the sidelink slot pattern used by the UE 115-*e* may also be shared with the UE 115-*f* and updated in SCI, a MAC-CE, or RRC signaling, and the UE 115-*f* may schedule sidelink communications with the UE 115-*e* based on the slot pattern used by the UE 115-*e* (e.g., and the slot pattern used by the UE 115-*f*).

In other cases (e.g., in resource allocation mode 1), to allow for efficient scheduling of sidelink communications between the UE 115-*e* and the UE 115-*f*, the UE 115-*e* may inform the base station 105-*b* of the mode in which the UE 115-*e* is operating. The UE 115-*e* may also inform the base station 105-*b* of whether the UE 115 is capable of full-duplex communications and whether the UE 115-*e* is capable of falling back to a half-duplex mode. That is, a sidelink UE 115 may inform a serving base station 105 of the mode in which the sidelink UE 115 is operating, whether the UE 115 supports full-duplex communications, whether the UE 115 is capable of falling back to a half-duplex mode, or a combination thereof. Thus, the base station 105-*b* may be able to identify the constraints of the UE 115-*e* when scheduling sidelink communications between the UE 115-*e* and the UE 115-*f*. The base station 105-*b* may then schedule sidelink communications between the UE 115-*e* and the UE 115-*f* based on the duplex mode, the full-duplex capability, or the half-duplex fallback capability of the UE 115-*e*. The UE 115-*f* may also indicate the duplex mode, full-duplex capability, or the half-duplex fallback capability of the UE 115-*f* to the base station 105-*b*, and the base station 105-*b* may schedule the sidelink communications between the UE 115-*e* and the UE 115-*f* based on the duplex mode, the full-duplex capability, or the half-duplex fallback capability of the UE 115-*f*.

In some aspects, the UE 115-*e* may decide whether to operate in a full-duplex mode or fall back to a half-duplex mode based on CSI feedback from other UEs 115 (e.g., including the UE 115-*f*). If the UE 115-*e* decides to change a duplex mode, the UE 115-*e* may request a mode switch and trigger a reconfiguration to the base station 105-*b* (e.g., the serving base station 105). As an example, if the UE 115-*e* determines that a level of interference satisfies an interference threshold, the UE 115-*e* may transmit, to the base station 105-*b*, a request to operate in a half-duplex mode. The UE 115-*e* may then receive a reconfiguration message from the base station 105-*b* configuring the UE 115-*e* to operate in the half-duplex mode. In other aspects, the UE 115-*e* may forward CSI reports received from other UEs 115 (e.g., including the UE 115-*f*) to the base station 105-*b*, and the base station 105-*b* may decide whether to configure the UE 115-*e* for full-duplex communications or half-duplex communications (e.g., reconfigure the UE 115-*e* for half-duplex communications).

Figure 6:
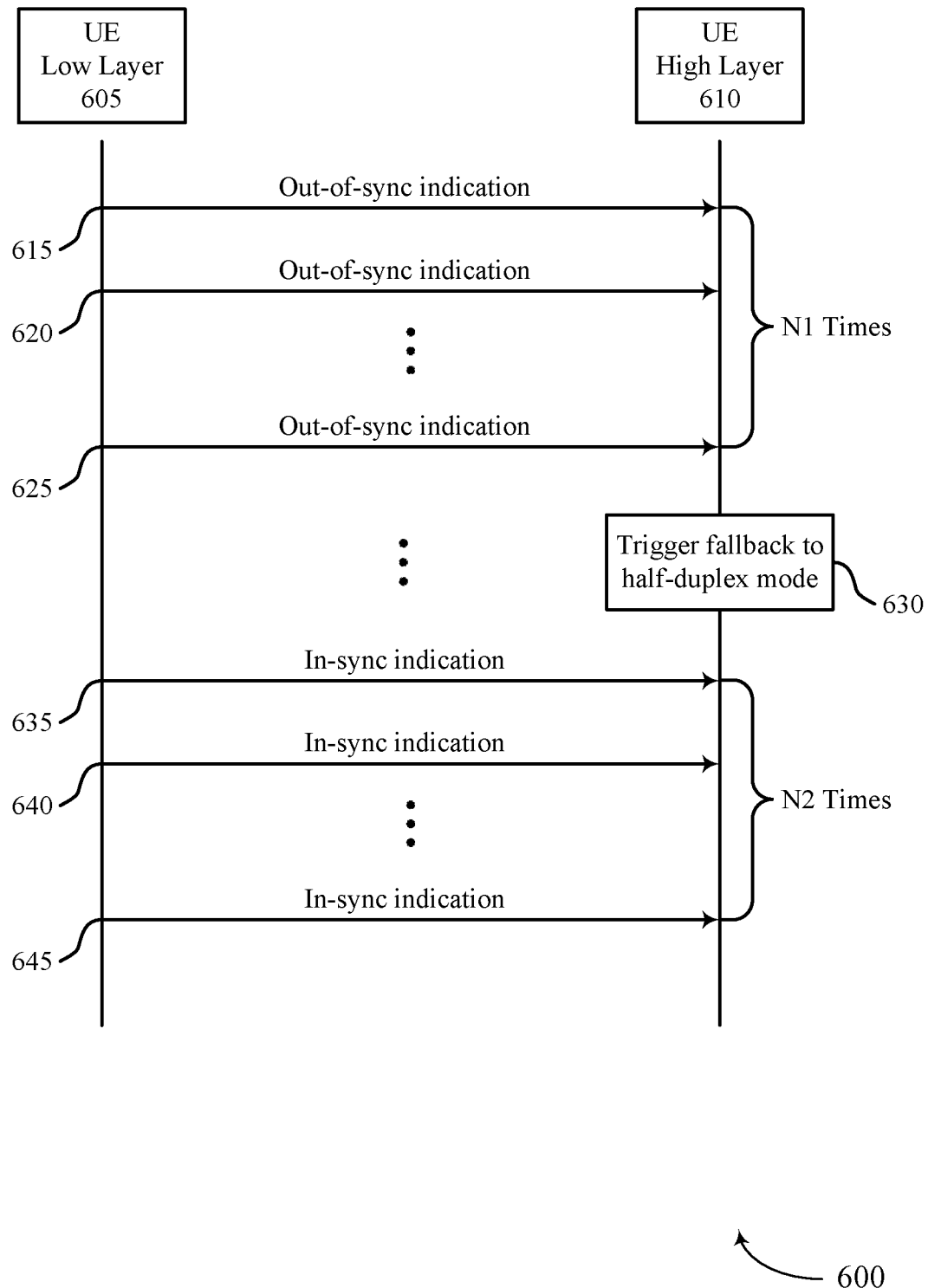
FIG. 6 illustrates an example of a process flow that supports sidelink interference monitoring for full-duplex and half-duplex operation in accordance with aspects of the present disclosure.

FIG. 6 illustrates an example of a process flow 600 that supports sidelink interference monitoring for full-duplex and half-duplex operation in accordance with aspects of the present disclosure. The process flow 600 illustrates aspects of techniques performed at a low layer 605 and a high layer 610 at a UE 115, which may be an example of a UE 115 described with reference to FIGS. 1-5.

Each time the low layer 605 at the UE 115 detects that a level of interference satisfies a threshold, the low layer 605 may transmit an out-of-sync indication to the high layer 610. As an example, the low layer 605 may detect that the level of interference satisfies the threshold after a number of consecutive decoding failures. For instance, within a duration of time (e.g., predefined timer), the low layer 605 may count a number of continuous decoding failure occasions. Once the number of consecutive decoding failure occasions exceeds a threshold, the low layer 605 may determine that the level of interference satisfies the threshold and may transmit an out-of-sync indication to the high layer 610. Similarly, each time the low layer 605 at the UE 115 detects that a level of self-interference fails to satisfy a threshold, the low layer 605 may transmit an in-sync indication to the high layer 610. The low layer 605 may detect that the level of self-interference fails to satisfy the threshold after a number of consecutive decoding successes. For example, within a duration of time (e.g., predefined timer), the low layer 605 may count a number of continuous decoding success occasions. Once the number of consecutive decoding success occasions exceeds a threshold, the low layer 605 may determine that the level of interference fails to satisfy a threshold and may transmit an in-sync indication to the high layer 610.

In one example, the low layer 605 at a UE 115 may identify decoding failures and successes based on comparing at least one measurement performed on CSI-RSs received on CSI-IM resources to a threshold. In this example, the low layer 605 may determine that there is a decoding failure when an RSRP, RSRQ, or SINR of the CSI-RSs is below a threshold or a corresponding BLER of the CSI-RSs is equal to or above a threshold. Alternatively, the low layer 605 may determine that there is a decoding success when the RSRP, RSRQ, or SINR of the CSI-RSs is equal to or above a threshold or a corresponding BLER is below a threshold. In another example, the low layer 605 at the UE 115 may identify decoding failures and successes based on whether the UE 115 is able to decode a data packet transmitted by the UE 115. In this example, the low layer 605 may determine that there is a decoding failure when the UE 115 fails to decode the data packet or the quality of the decoded data packet is below a threshold. Alternatively, the low layer 605 may determine that there is a decoding success when the UE 115 successfully decodes the data packet or the quality of the decoded data packet is above a threshold.

If the high layer 610 at the UE 115 receives a threshold number of consecutive out-of-sync indications, the high layer 610 may trigger a fallback at the UE 115 from a full-duplex mode to a half-duplex mode (e.g., if the UE 115 is not already operating in a half-duplex mode). Alternatively, if the high layer 610 at the UE 115 receives a threshold number of consecutive in-sync indications, the high layer 610 may trigger a switch at the UE 115 from a half-duplex mode to a full-duplex mode (e.g., if the UE 115 is not already operating in a full-duplex mode). In the example of FIGS. 6, at 615, 620, and 625, the high layer 610 at the UE 115 may receive the threshold number of out-of-sync indications from the low layer 605 (e.g., N1). Thus, at 630, the high layer 610 may trigger a fall back to a half-duplex mode. Then, at 635, 640, and 645, the high layer 610 at the UE 115 may receive the threshold number of in-sync indications from the low layer 605 (e.g., N2). Thus, the high layer 610 at the UE 115 may trigger a switch back to a full-duplex mode.

Figure 7:
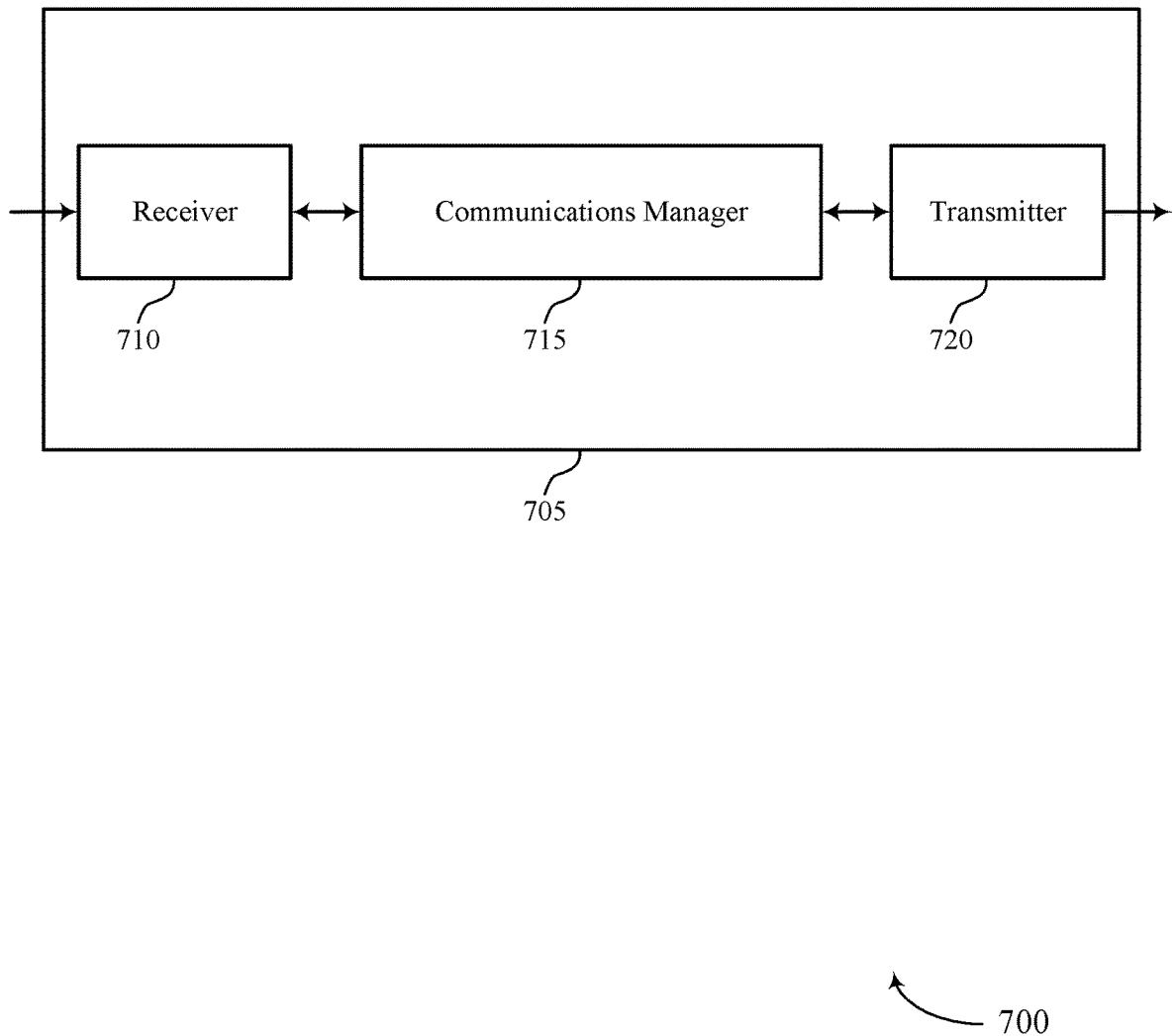
FIGS. 7 and 8 show block diagrams of devices that support sidelink interference monitoring for full-duplex and half-duplex operation in accordance with aspects of the present disclosure.

FIG. 7 shows a block diagram 700 of a device 705 that supports sidelink interference monitoring for full-duplex and half-duplex operation in accordance with aspects of the present disclosure. The device 705 may be an example of aspects of a UE 115 as described herein. The device 705 may include a receiver 710, a communications manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to sidelink interference monitoring for full-duplex and half-duplex operation, etc.). Information may be passed on to other components of the device 705. The receiver 710 may be an example of aspects of the transceiver 1020 described with reference to FIG. 10. The receiver 710 may utilize a single antenna or a set of antennas.

The communications manager 715 may transmit on resources allocated for interference measurements at the UE, where the UE is operating in a full-duplex mode for sidelink communications, determine that a level of interference between transmissions and receptions at the UE satisfies an interference threshold based on the transmitting, and switch to a half-duplex mode for sidelink communications based on the determining. The communications manager 715 may be an example of aspects of the communications manager 1010 described herein.

The communications manager 715, or its sub-components, may be implemented in hardware, code (e.g., software or firmware) executed by a processor, or any combination thereof. If implemented in code executed by a processor, the functions of the communications manager 715, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 715, or its sub-components, may be physically located at various positions, including being distributed such that portions of functions are implemented at different physical locations by one or more physical components. In some examples, the communications manager 715, or its sub-components, may be a separate and distinct component in accordance with various aspects of the present disclosure. In some examples, the communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver module. For example, the transmitter 720 may be an example of aspects of the transceiver 1020 described with reference to FIG. 10. The transmitter 720 may utilize a single antenna or a set of antennas.

Figure 8:
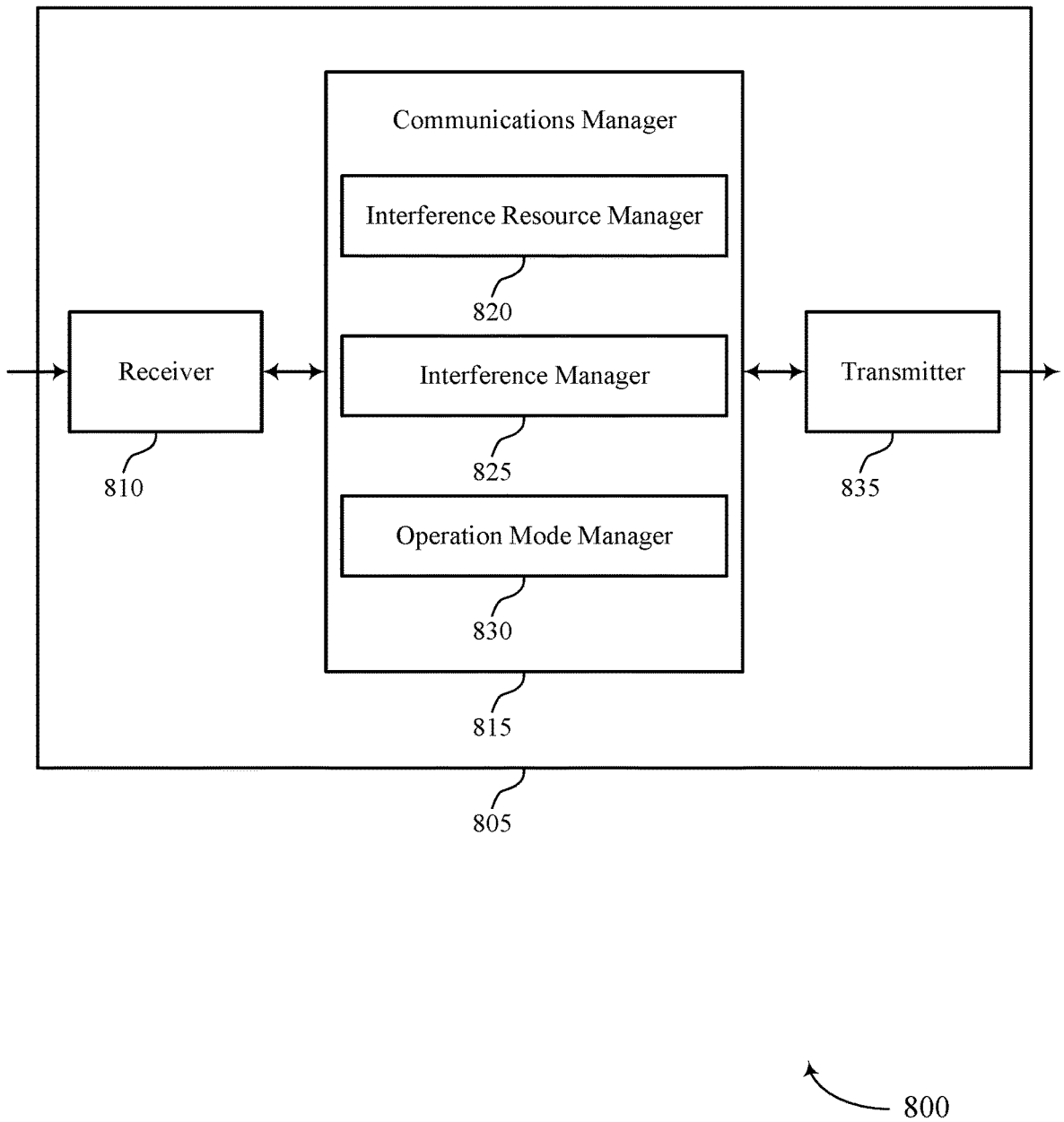

FIG. 8 shows a block diagram 800 of a device 805 that supports sidelink interference monitoring for full-duplex and half-duplex operation in accordance with aspects of the present disclosure. The device 805 may be an example of aspects of a device 705, or a UE 115 as described herein. The device 805 may include a receiver 810, a communications manager 815, and a transmitter 835. The device 805 may also include a processor. Each of these components may be in communication with one another (e.g., via one or more buses).

The receiver 810 may receive information such as packets, user data, or control information associated with various information channels (e.g., control channels, data channels, and information related to sidelink interference monitoring for full-duplex and half-duplex operation, etc.). Information may be passed on to other components of the device 805. The receiver 810 may be an example of aspects of the transceiver 1020 described with reference to FIG. 10. The receiver 810 may utilize a single antenna or a set of antennas.

The communications manager 815 may be an example of aspects of the communications manager 715 as described herein. The communications manager 815 may include an interference resource manager 820, an interference manager 825, and an operation mode manager 830. The communications manager 815 may be an example of aspects of the communications manager 1010 described herein.

The interference resource manager 820 may transmit on resources allocated for interference measurements at the UE, where the UE is operating in a full-duplex mode for sidelink communications. The interference manager 825 may determine that a level of interference between transmissions and receptions at the UE satisfies an interference threshold based on the transmitting. The operation mode manager 830 may switch to a half-duplex mode for sidelink communications based on the determining.

The transmitter 835 may transmit signals generated by other components of the device 805. In some examples, the transmitter 835 may be collocated with a receiver 810 in a transceiver module. For example, the transmitter 835 may be an example of aspects of the transceiver 1020 described with reference to FIG. 10. The transmitter 835 may utilize a single antenna or a set of antennas.

Figure 9:
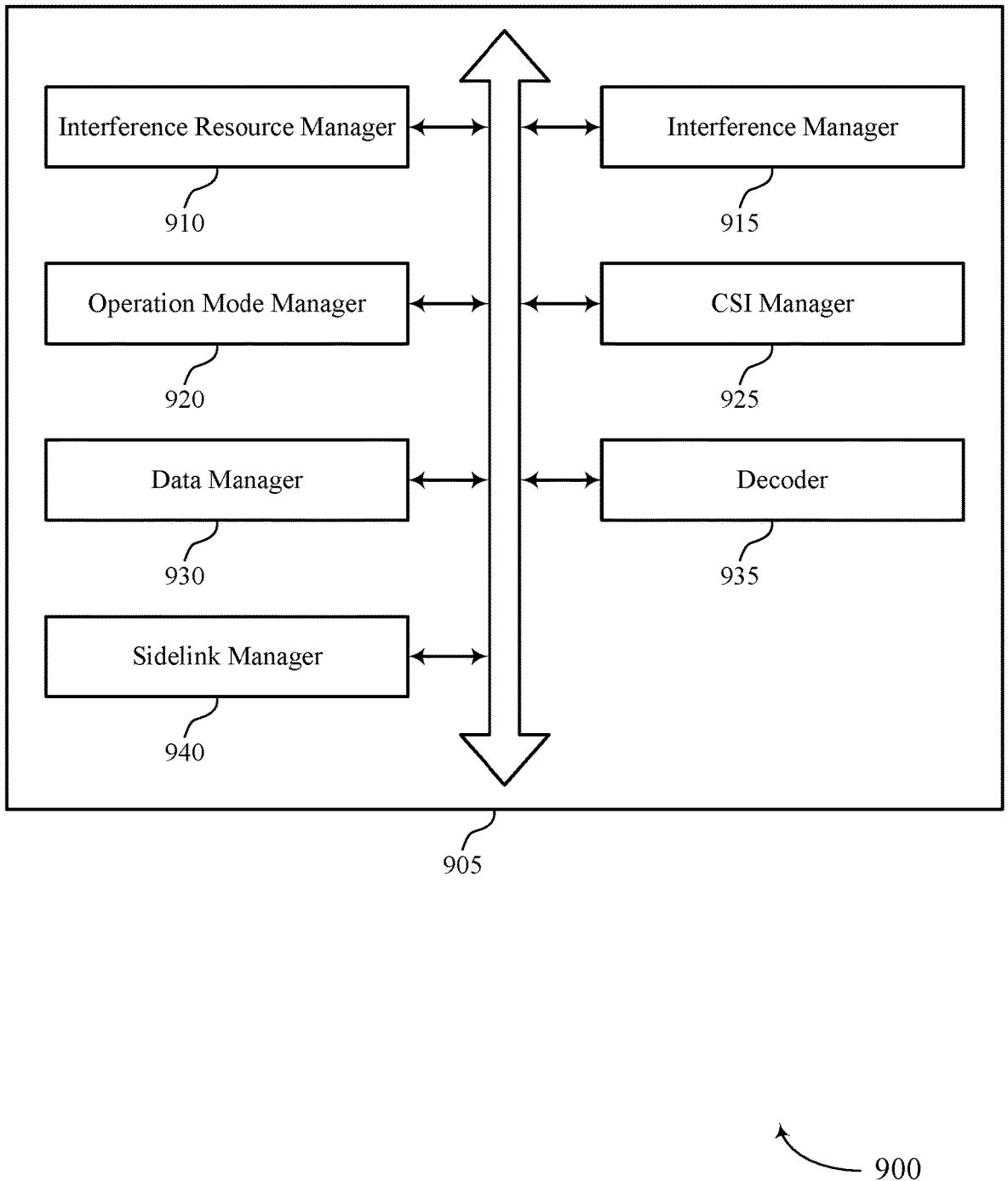
FIG. 9 shows a block diagram of a communications manager that supports sidelink interference monitoring for full-duplex and half-duplex operation in accordance with aspects of the present disclosure.

FIG. 9 shows a block diagram 900 of a communications manager 905 that supports sidelink interference monitoring for full-duplex and half-duplex operation in accordance with aspects of the present disclosure. The communications manager 905 may be an example of aspects of a communications manager 715, a communications manager 815, or a communications manager 1010 described herein. The communications manager 905 may include an interference resource manager 910, an interference manager 915, an operation mode manager 920, a CSI manager 925, a data manager 930, a decoder 935, and a sidelink manager 940. Each of these modules may communicate, directly or indirectly, with one another (e.g., via one or more buses).

The interference resource manager 910 may transmit on resources allocated for interference measurements at the UE, where the UE is operating in a full-duplex mode for sidelink communications. The interference manager 915 may determine that a level of interference between transmissions and receptions at the UE satisfies an interference threshold based on the transmitting. The operation mode manager 920 may switch to a half-duplex mode for sidelink communications based on the determining.

The CSI manager 925 may transmit channel state information reference signals on the resources allocated for interference measurements, where the interference measurements include channel state information interference measurements. In some examples, the interference manager 915 may perform at least one measurement on the resources allocated for interference measurements, where determining that the level of interference satisfies the interference threshold is based on performing the at least one measurement. In some examples, comparing the at least one measurement to the interference threshold, where determining that the level of interference satisfies the interference threshold includes determining that the at least one measurement satisfies the interference threshold. In some examples, the interference manager 915 may map the at least one measurement to a block error rate. In some examples, the interference manager 915 may compare the block error rate to the interference threshold, where determining that the level of interference satisfies the interference threshold includes determining that the block error rate satisfies the interference threshold.

The data manager 930 may transmit a data packet on the resources allocated for interference measurements. The decoder 935 may decode the data packet, where determining that the level of interference satisfies the interference threshold is based on decoding the data packet. In some examples, the interference manager 915 may send an out-of-sync indication from a lower layer at the UE to an upper layer at the UE each time the UE determines that the level of interference between transmissions and receptions at the UE satisfies the interference threshold. In some examples, the operation mode manager 920 may switch to the half-duplex mode for sidelink communications based on the upper layer at the UE receiving a threshold number of consecutive out-of-sync indications. In some examples, the interference manager 915 may send in-sync indications from a lower layer at the UE to an upper layer at the UE each time the UE determines that the level of interference between transmissions and receptions at the UE fails to satisfy the interference threshold. In some examples, the operation mode manager 920 may switch back to the full-duplex mode for sidelink communications based on the upper layer at the UE receiving a threshold number of consecutive in-sync indications.

In some cases, the UE is a first UE, and the operation mode manager 920 may transmit, to a second UE after switching to the half-duplex mode, an indication that the first UE is operating in the half-duplex mode for sidelink communications. In some examples, the operation mode manager 920 may receive, from a second UE, an indication of whether the second UE is operating in the full-duplex mode or the half-duplex mode for sidelink communications. The sidelink manager 940 may schedule sidelink communications with the second UE based on whether the second UE is operating in the full-duplex mode or the half-duplex mode. In some cases, the UE is a first UE, and the sidelink manager 940 may transmit, to a second UE, an indication of a slot pattern used by the first UE for sidelink communications. In some cases, the UE is a first UE, and the sidelink manager 940 may receive, from a second UE, an indication of a slot pattern used by the second UE for sidelink communications. In some examples, the sidelink manager 940 may schedule sidelink communications with the second UE based on the slot pattern used by the second UE for sidelink communications.

In some examples, the operation mode manager 920 may transmit, to a base station, a request to operate in the half-duplex mode based on the level of interference satisfying the interference threshold. In some examples, the operation mode manager 920 may receive a reconfiguration message from the base station configuring the UE to operate in the half-duplex mode, where falling back to the half-duplex mode for sidelink communications is based on receiving the reconfiguration message. In some cases, the UE is a first UE, and the CSI manager 925 may forward, to a base station, a channel state information report received from a second UE. In some examples, the operation mode manager 920 may receive, from the base station, an indication of whether to operate in the full-duplex mode or the half-duplex mode for sidelink communications based on forwarding the channel state information report. In some examples, the interference resource manager 910 may receive a control message from a base station indicating the resources allocated for interference measurements. In some cases, the resources allocated for interference measurements are periodic. In some examples, operating in full-duplex mode includes simultaneously transmitting and receiving on a same set of time and frequency resources, and where operating in half-duplex mode includes either transmitting or receiving on a set of time and frequency resources.

Figure 10:
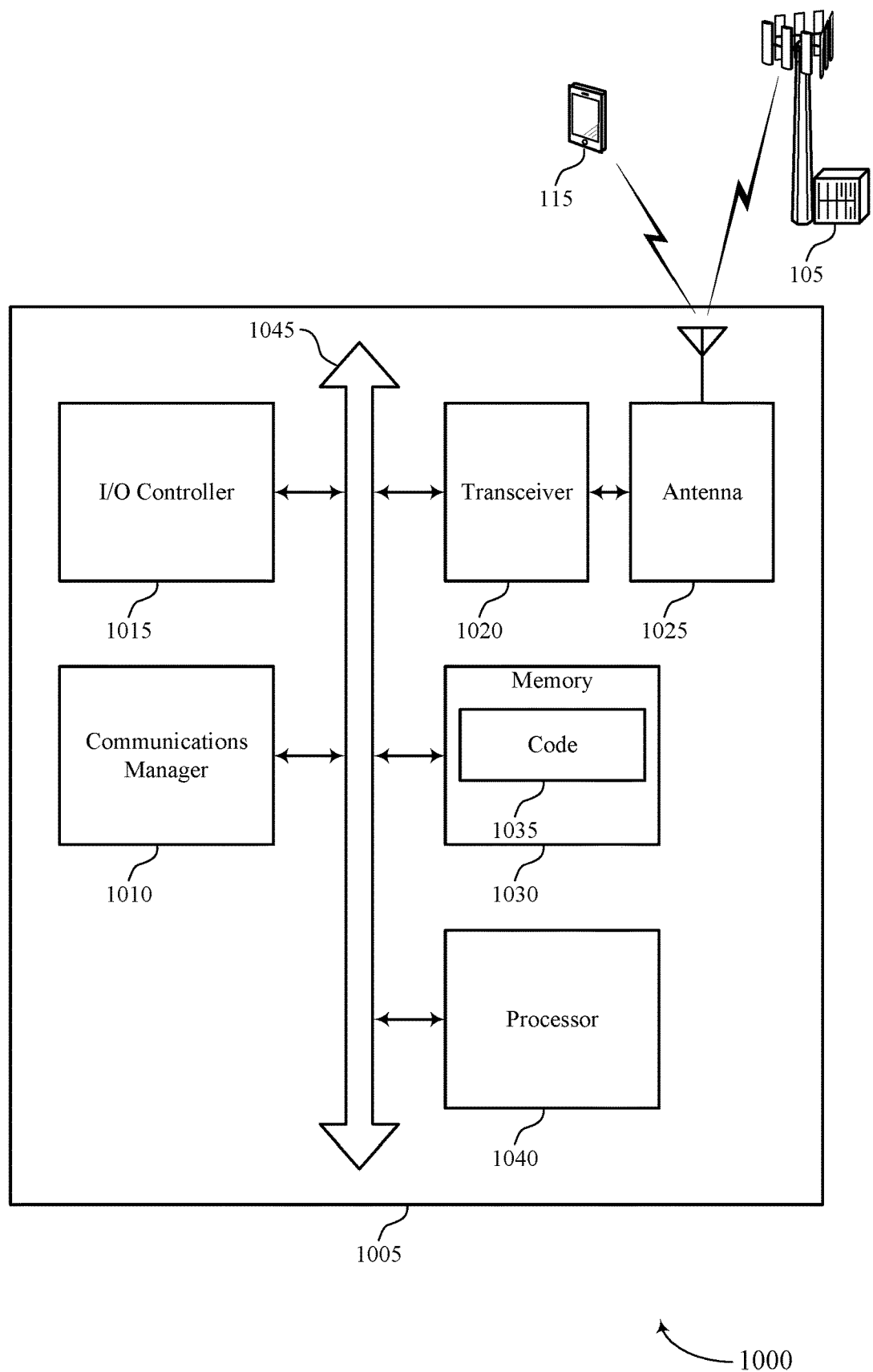
FIG. 10 shows a diagram of a system including a device that supports sidelink interference monitoring for full-duplex and half-duplex operation in accordance with aspects of the present disclosure.

FIG. 10 shows a diagram of a system 1000 including a device 1005 that supports sidelink interference monitoring for full-duplex and half-duplex operation in accordance with aspects of the present disclosure. The device 1005 may be an example of or include the components of device 705, device 805, or a UE 115 as described herein. The device 1005 may include components for bi-directional voice and data communications including components for transmitting and receiving communications, including a communications manager 1010, an I/O controller 1015, a transceiver 1020, an antenna 1025, memory 1030, and a processor 1040. These components may be in electronic communication via one or more buses (e.g., bus 1045).

The communications manager 1010 may transmit on resources allocated for interference measurements at the UE, where the UE is operating in a full-duplex mode for sidelink communications, determine that a level of interference between transmissions and receptions at the UE satisfies an interference threshold based on the transmitting, and switch to a half-duplex mode for sidelink communications based on the determining.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include random-access memory (RAM) and read-only memory (ROM). The memory 1030 may store computer-readable, computer-executable code 1035 including instructions that, when executed, cause the processor to perform various functions described herein. In some cases, the memory 1030 may contain, among other things, a basic input/output system (BIOS) which may control basic hardware or software operation such as the interaction with peripheral components or devices.

The processor 1040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting sidelink interference monitoring for full-duplex and half-duplex operation).

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
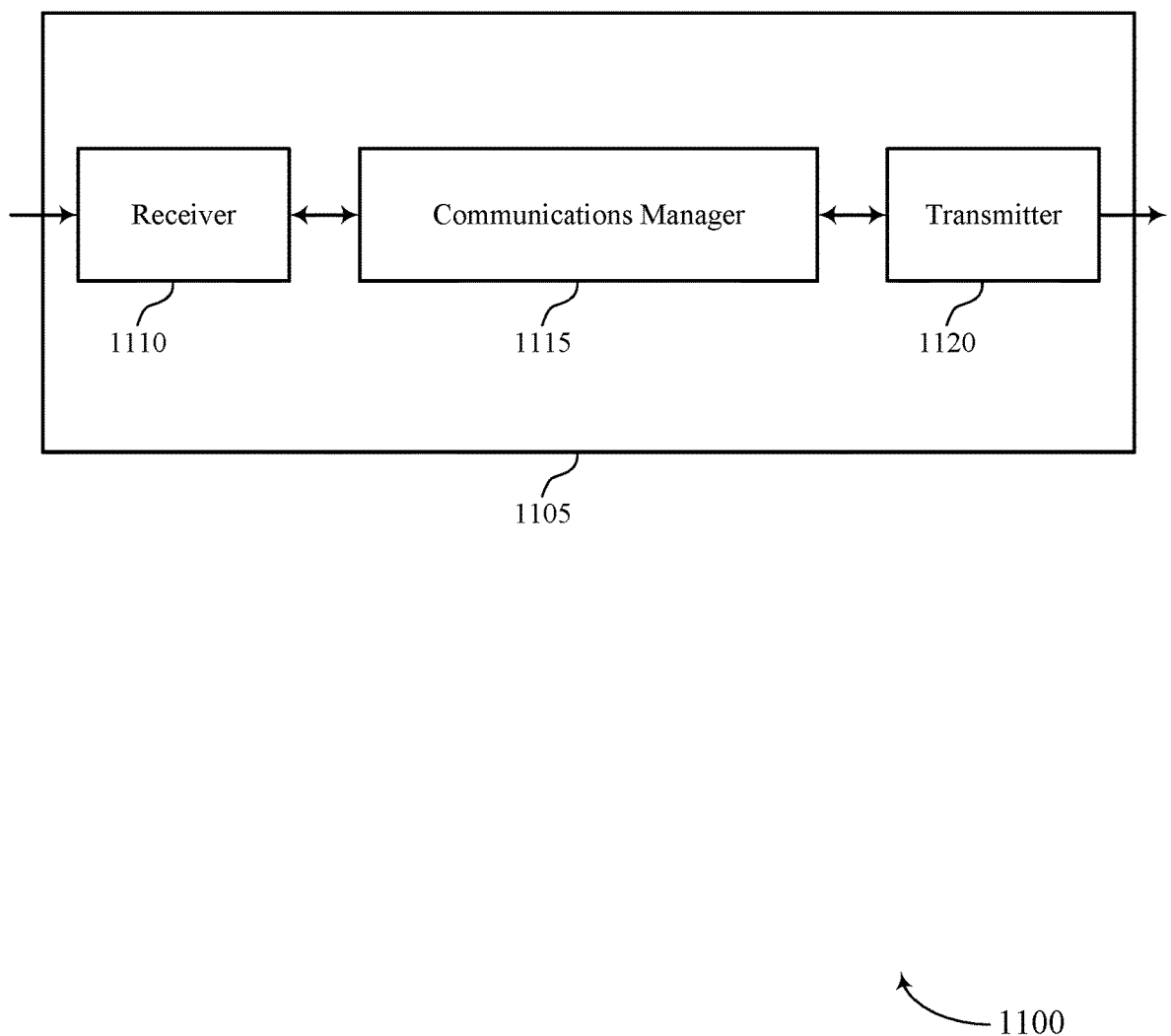
FIGS. 11 and 12 show block diagrams of devices that support sidelink interference monitoring for full-duplex and half-duplex operation in accordance with aspects of the present disclosure.

FIG. 11 shows a block diagram 1100 of a device 1105 that supports sidelink interference monitoring for full-duplex and half-duplex operation in accordance with aspects of the present disclosure. The device 1105 may be an example of aspects of a base station 105 as described herein. The device 1105 may include a receiver 1110, a communications manager 1115, and a transmitter 1120. The device 1105 may also include a processor. Each of these components may be in communication with one another (e.g., via one or more buses).

The receiver 1110 may receive information such as packets, user data, or control information associated with various information channels (e.g., control channels, data channels, and information related to sidelink interference monitoring for full-duplex and half-duplex operation, etc.). Information may be passed on to other components of the device 1105. The receiver 1110 may be an example of aspects of the transceiver 1420 described with reference to FIG. 14. The receiver 1110 may utilize a single antenna or a set of antennas.

The communications manager 1115 may transmit, to a first UE, a control message indicating resources allocated for interference measurements, identify whether the first UE is operating in a full-duplex mode or a half-duplex mode for sidelink communications based on transmitting the control message, and schedule sidelink communications between the first UE and a second UE based on the identifying. The communications manager 1115 may be an example of aspects of the communications manager 1410 described herein.

The communications manager 1115, or its sub-components, may be implemented in hardware, code (e.g., software or firmware) executed by a processor, or any combination thereof. If implemented in code executed by a processor, the functions of the communications manager 1115, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1115, or its sub-components, may be physically located at various positions, including being distributed such that portions of functions are implemented at different physical locations by one or more physical components. In some examples, the communications manager 1115, or its sub-components, may be a separate and distinct component in accordance with various aspects of the present disclosure. In some examples, the communications manager 1115, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1420 described with reference to FIG. 14. The transmitter 1120 may utilize a single antenna or a set of antennas.

Figure 12:
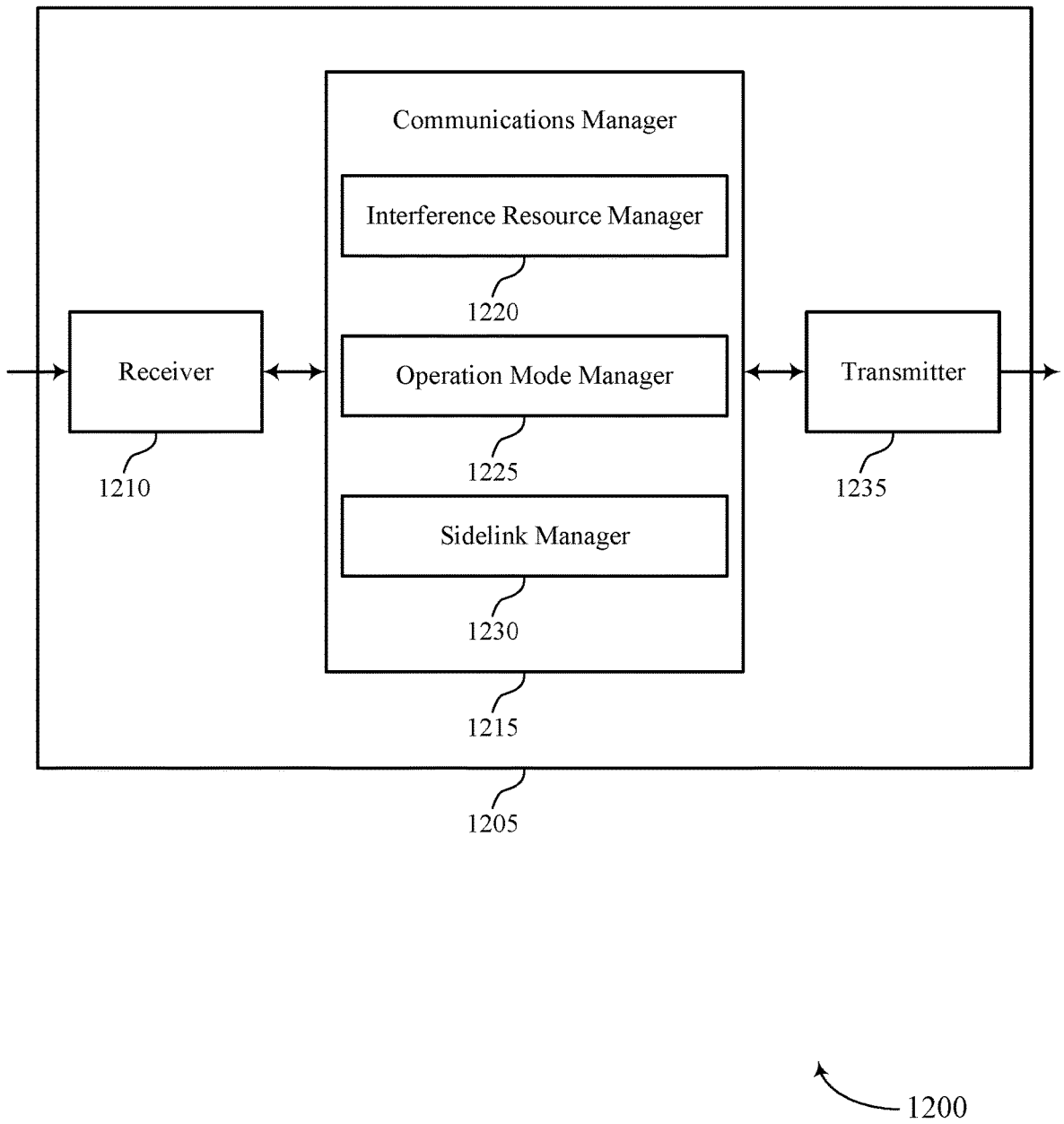

FIG. 12 shows a block diagram 1200 of a device 1205 that supports sidelink interference monitoring for full-duplex and half-duplex operation in accordance with aspects of the present disclosure. The device 1205 may be an example of aspects of a device 1105, or a base station 105 as described herein. The device 1205 may include a receiver 1210, a communications manager 1215, and a transmitter 1235. The device 1205 may also include a processor. Each of these components may be in communication with one another (e.g., via one or more buses).

The receiver 1210 may receive information such as packets, user data, or control information associated with various information channels (e.g., control channels, data channels, and information related to sidelink interference monitoring for full-duplex and half-duplex operation, etc.). Information may be passed on to other components of the device 1205. The receiver 1210 may be an example of aspects of the transceiver 1420 described with reference to FIG. 14. The receiver 1210 may utilize a single antenna or a set of antennas.

The communications manager 1215 may be an example of aspects of the communications manager 1115 as described herein. The communications manager 1215 may include an interference resource manager 1220, an operation mode manager 1225, and a sidelink manager 1230. The communications manager 1215 may be an example of aspects of the communications manager 1410 described herein.

The interference resource manager 1220 may transmit, to a first UE, a control message indicating resources allocated for interference measurements. The operation mode manager 1225 may identify whether the first UE is operating in a full-duplex mode or a half-duplex mode for sidelink communications based on transmitting the control message. The sidelink manager 1230 may schedule sidelink communications between the first UE and a second UE based on the identifying.

The transmitter 1235 may transmit signals generated by other components of the device 1205. In some examples, the transmitter 1235 may be collocated with a receiver 1210 in a transceiver module. For example, the transmitter 1235 may be an example of aspects of the transceiver 1420 described with reference to FIG. 14. The transmitter 1235 may utilize a single antenna or a set of antennas.

Figure 13:
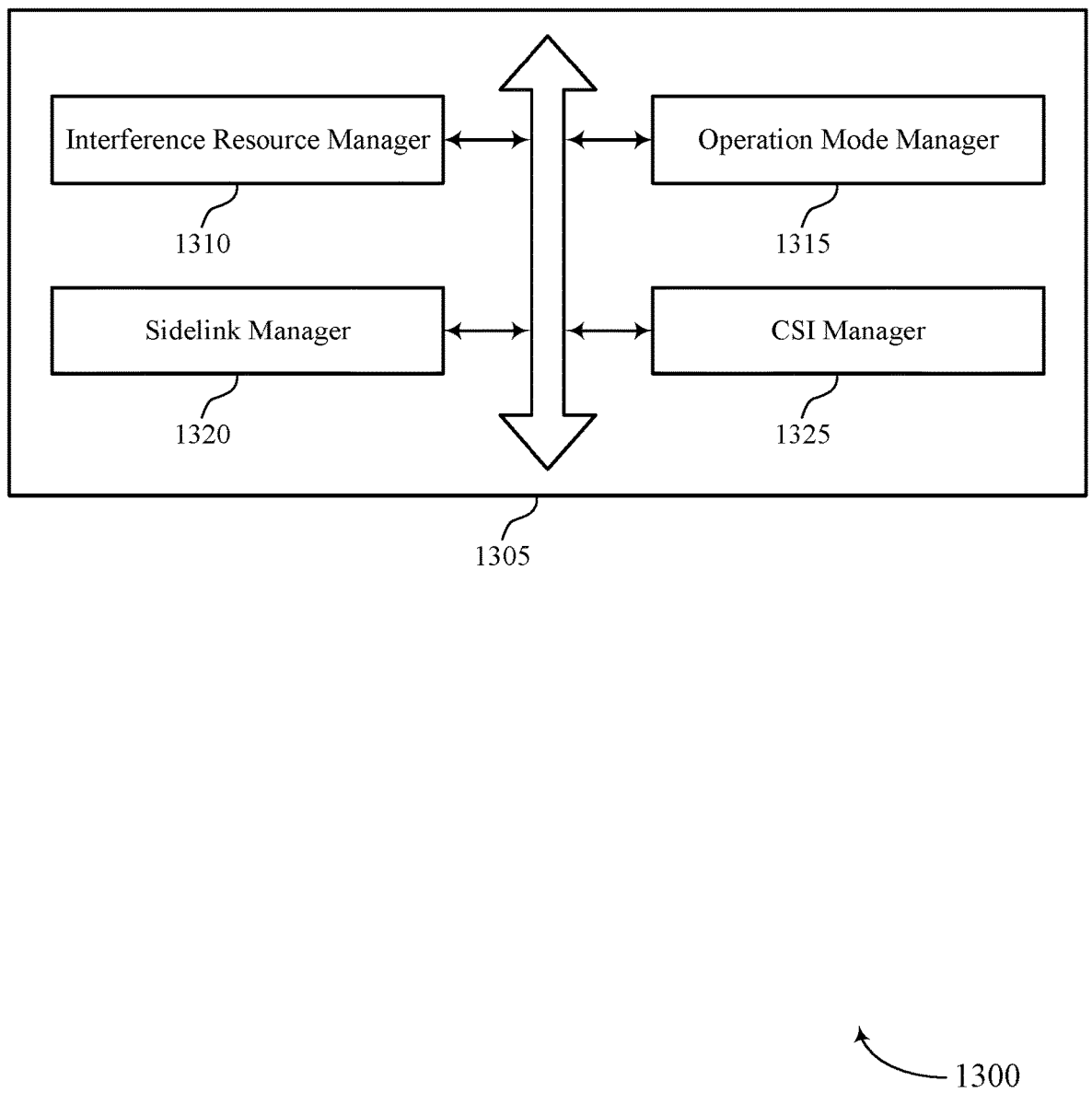
FIG. 13 shows a block diagram of a communications manager that supports sidelink interference monitoring for full-duplex and half-duplex operation in accordance with aspects of the present disclosure.

FIG. 13 shows a block diagram 1300 of a communications manager 1305 that supports sidelink interference monitoring for full-duplex and half-duplex operation in accordance with aspects of the present disclosure. The communications manager 1305 may be an example of aspects of a communications manager 1115, a communications manager 1215, or a communications manager 1410 described herein. The communications manager 1305 may include an interference resource manager 1310, an operation mode manager 1315, a sidelink manager 1320, and a CSI manager 1325. Each of these modules may communicate, directly or indirectly, with one another (e.g., via one or more buses).

The interference resource manager 1310 may transmit, to a first UE, a control message indicating resources allocated for interference measurements. The operation mode manager 1315 may identify whether the first UE is operating in a full-duplex mode or a half-duplex mode for sidelink communications based on transmitting the control message. The sidelink manager 1320 may schedule sidelink communications between the first UE and a second UE based on the identifying.

In some examples, the operation mode manager 1315 may receive, from the first UE, a request to operate in a full-duplex mode or a half-duplex mode. In some examples, the operation mode manager 1315 may transmit, to the first UE, a reconfiguration message configuring the UE to operate in the full-duplex mode or the half-duplex mode, where identifying whether the first UE is operating in the full-duplex mode or the half-duplex mode for sidelink communications is based on transmitting the reconfiguration message.

The CSI manager 1325 may receive, from the first UE, a channel state information report forwarded from the second UE. In some examples, the operation mode manager 1315 may transmit, to the first UE, an indication of whether to operate in the full-duplex mode or the half-duplex mode for sidelink communications based on the channel state information report, where identifying whether the first UE is operating in the full-duplex mode or the half-duplex mode for sidelink communications is based on transmitting the indication. In some cases, the resources allocated for interference measurements are periodic.

Figure 14:
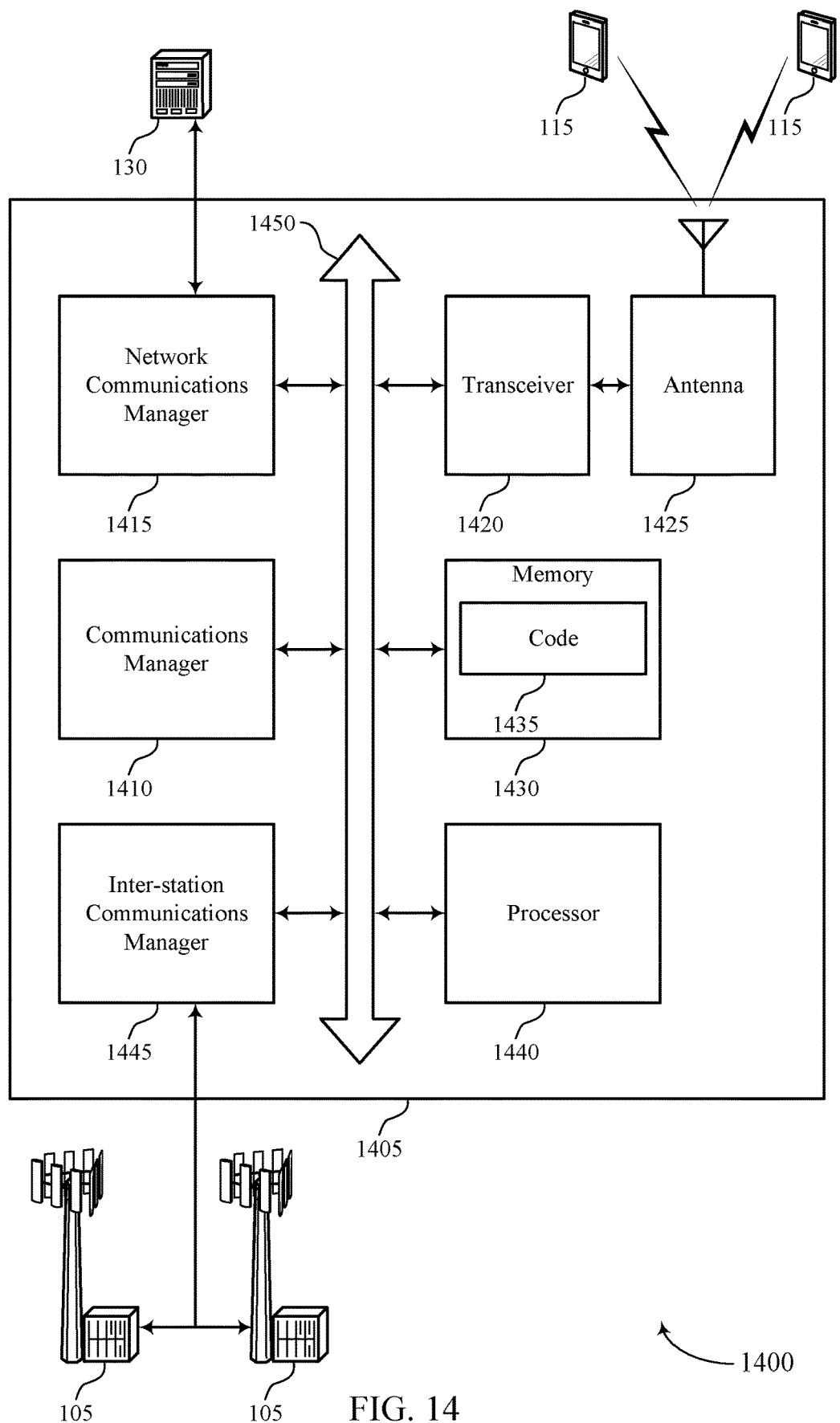
FIG. 14 shows a diagram of a system including a device that supports sidelink interference monitoring for full-duplex and half-duplex operation in accordance with aspects of the present disclosure.

FIG. 14 shows a diagram of a system 1400 including a device 1405 that supports sidelink interference monitoring for full-duplex and half-duplex operation in accordance with aspects of the present disclosure. The device 1405 may be an example of or include the components of device 1105, device 1205, or a base station 105 as described herein. The device 1405 may include components for bi-directional voice and data communications including components for transmitting and receiving communications, including a communications manager 1410, a network communications manager 1415, a transceiver 1420, an antenna 1425, memory 1430, a processor 1440, and an inter-station communications manager 1445. These components may be in electronic communication via one or more buses (e.g., bus 1450).

The communications manager 1410 may transmit, to a first UE, a control message indicating resources allocated for interference measurements, identify whether the first UE is operating in a full-duplex mode or a half-duplex mode for sidelink communications based on transmitting the control message, and schedule sidelink communications between the first UE and a second UE based on the identifying.

The network communications manager 1415 may manage communications with the core network (e.g., via one or more wired backhaul links). For example, the network communications manager 1415 may manage the transfer of data communications for client devices, such as one or more UEs 115.

The transceiver 1420 may communicate bi-directionally, via one or more antennas, wired, or wireless links as described above. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some cases, the wireless device may include a single antenna 1425. However, in some cases the device may have more than one antenna 1425, which may be capable of concurrently transmitting or receiving multiple wireless transmissions.

The memory 1430 may include RAM, ROM, or a combination thereof. The memory 1430 may store computer-readable code 1435 including instructions that, when executed by a processor (e.g., the processor 1440) cause the device to perform various functions described herein. In some cases, the memory 1430 may contain, among other things, a BIOS which may control basic hardware or software operation such as the interaction with peripheral components or devices.

The processor 1440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some cases, a memory controller may be integrated into processor 1440. The processor 1440 may be configured to execute computer-readable instructions stored in a memory (e.g., the memory 1430) to cause the device 1405 to perform various functions (e.g., functions or tasks supporting sidelink interference monitoring for full-duplex and half-duplex operation).

The inter-station communications manager 1445 may manage communications with other base station 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communication network technology to provide communication between base stations 105.

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

Figure 15:
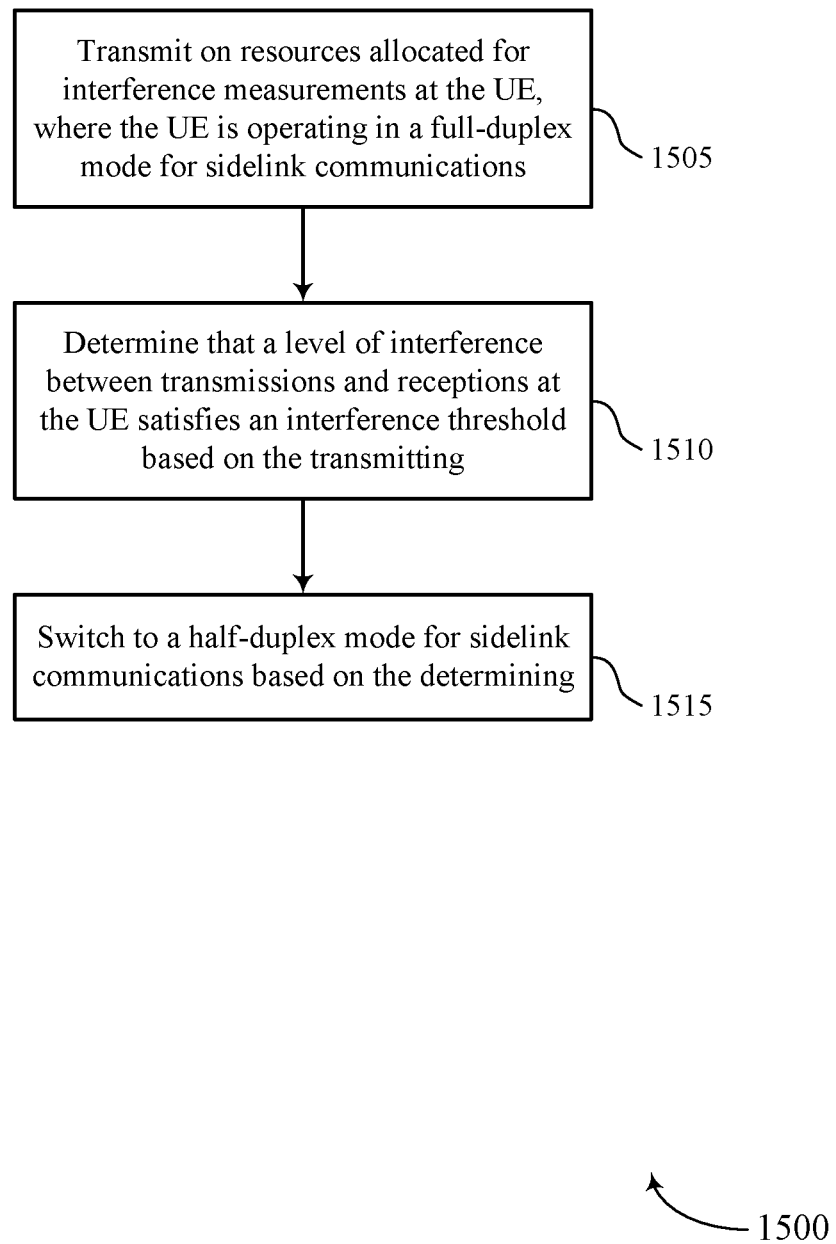
FIGS. 15 and 16 show flowcharts illustrating methods that support sidelink interference monitoring for full-duplex and half-duplex operation in accordance with aspects of the present disclosure.

FIG. 15 shows a flowchart illustrating a method 1500 that supports sidelink interference monitoring for full-duplex and half-duplex operation in accordance with aspects of the present disclosure. The operations of method 1500 may be implemented by a UE 115 or its components as described herein. For example, the operations of method 1500 may be performed by a communications manager as described with reference to FIGS. 7 through 10. In some examples, a UE may execute a set of instructions to control the functional elements of the UE to perform the functions described below. Additionally, or alternatively, a UE may perform aspects of the functions described below using special-purpose hardware.

At 1505, the UE may transmit on resources allocated for interference measurements at the UE, where the UE is operating in a full-duplex mode for sidelink communications. The operations of 1505 may be performed according to the methods described herein. In some examples, aspects of the operations of 1505 may be performed by an interference resource manager as described with reference to FIGS. 7 through 10.

At 1510, the UE may determine that a level of interference between transmissions and receptions at the UE satisfies an interference threshold based on the transmitting. The operations of 1510 may be performed according to the methods described herein. In some examples, aspects of the operations of 1510 may be performed by an interference manager as described with reference to FIGS. 7 through 10.

At 1515, the UE may switch to a half-duplex mode for sidelink communications based on the determining. The operations of 1515 may be performed according to the methods described herein. In some examples, aspects of the operations of 1515 may be performed by an operation mode manager as described with reference to FIGS. 7 through 10.

Figure 16:
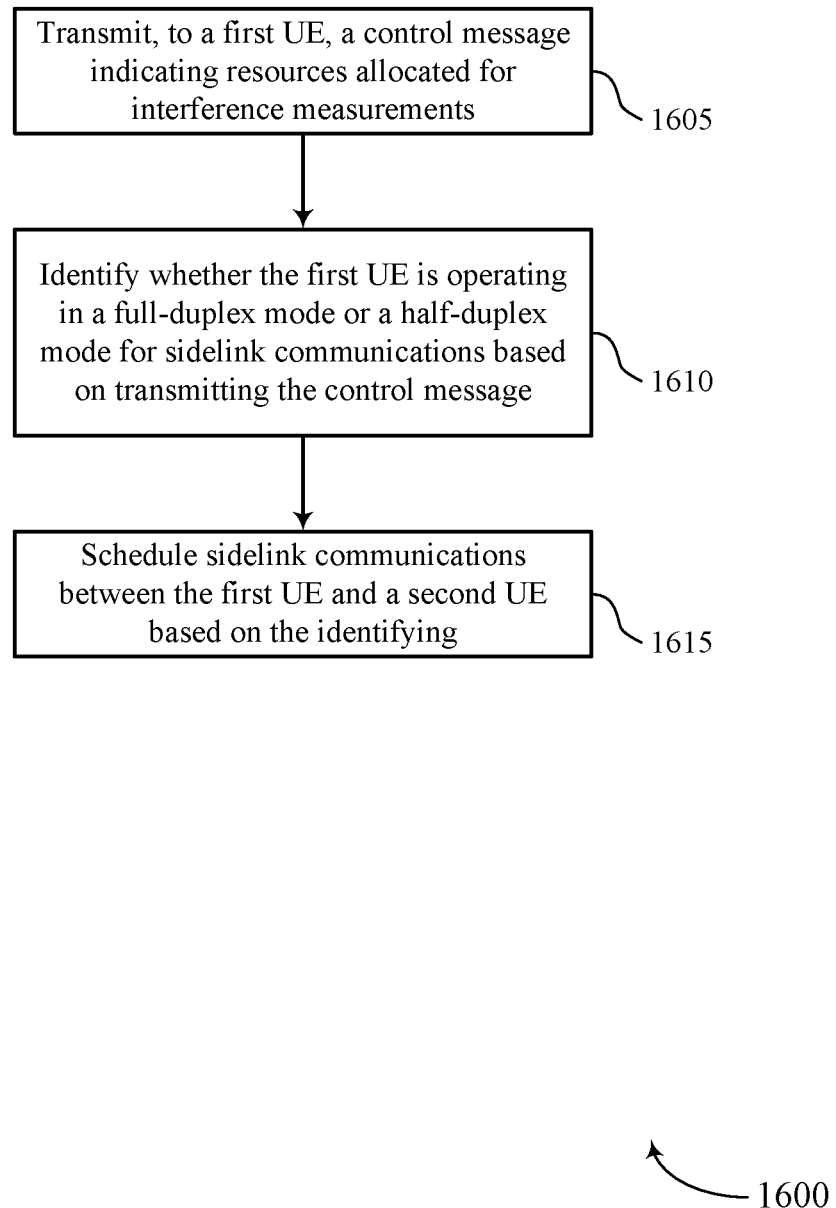

FIG. 16 shows a flowchart illustrating a method 1600 that supports sidelink interference monitoring for full-duplex and half-duplex operation in accordance with aspects of the present disclosure. The operations of method 1600 may be implemented by a base station 105 or its components as described herein. For example, the operations of method 1600 may be performed by a communications manager as described with reference to FIGS. 11 through 14. In some examples, a base station may execute a set of instructions to control the functional elements of the base station to perform the functions described below. Additionally, or alternatively, a base station may perform aspects of the functions described below using special-purpose hardware.

At 1605, the base station may transmit, to a first UE, a control message indicating resources allocated for interference measurements. The operations of 1605 may be performed according to the methods described herein. In some examples, aspects of the operations of 1605 may be performed by an interference resource manager as described with reference to FIGS. 11 through 14.

At 1610, the base station may identify whether the first UE is operating in a full-duplex mode or a half-duplex mode for sidelink communications based on transmitting the control message. The operations of 1610 may be performed according to the methods described herein. In some examples, aspects of the operations of 1610 may be performed by an operation mode manager as described with reference to FIGS. 11 through 14.

At 1615, the base station may schedule sidelink communications between the first UE and a second UE based on the identifying. The operations of 1615 may be performed according to the methods described herein. In some examples, aspects of the operations of 1615 may be performed by a sidelink manager as described with reference to FIGS. 11 through 14.

The following provides an overview of examples of the present disclosure:

Example 1: A method for wireless communications at a UE, comprising: transmitting on resources allocated for interference measurements at the UE, wherein the UE is operating in a full-duplex mode for sidelink communications; determining that a level of interference between transmissions and receptions at the UE satisfies an interference threshold based at least in part on the transmitting; and switching to a half-duplex mode for sidelink communications based at least in part on the determining.

Example 2: The method of example 1, wherein transmitting on resources allocated for interference measurements comprises: transmitting channel state information reference signals on the resources allocated for interference measurements, wherein the interference measurements comprise channel state information interference measurements.

Example 3: The method of any one of examples 1 or 2, further comprising: performing at least one measurement on the resources allocated for interference measurements, wherein determining that the level of interference satisfies the interference threshold is based at least in part on performing the at least one measurement.

Example 4: The method of any one of examples 1 through 3, further comprising: comparing the at least one measurement to the interference threshold, wherein determining that the level of interference satisfies the interference threshold comprises determining that the at least one measurement satisfies the interference threshold.

Example 5: The method of any one of examples 1 through 4, further comprising: mapping the at least one measurement to a block error rate; and comparing the block error rate to the interference threshold, wherein determining that the level of interference satisfies the interference threshold comprises determining that the block error rate satisfies the interference threshold.

Example 6: The method of any one of examples 1 through 5, wherein transmitting on resources allocated for interference measurements comprises: transmitting a data packet on the resources allocated for interference measurements.

Example 7: The method of any one of examples 1 through 6, further comprising: decoding the data packet, wherein determining that the level of interference satisfies the interference threshold is based at least in part on decoding the data packet.

Example 8: The method of any one of examples 1 through 7, further comprising: sending an out-of-sync indication from a lower layer at the UE to an upper layer at the UE each time the UE determines that the level of interference between transmissions and receptions at the UE satisfies the interference threshold.

Example 9: The method of any one of examples 1 through 8, wherein switching to the half-duplex mode for sidelink communications is based at least in part on the upper layer at the UE receiving a threshold number of consecutive out-of-sync indications.

Example 10: The method of any one of examples 1 through 9, further comprising: sending in-sync indications from a lower layer at the UE to an upper layer at the UE each time the UE determines that the level of interference between transmissions and receptions at the UE fails to satisfy the interference threshold.

Example 11: The method of any one of examples 1 through 10, further comprising: switching back to the full-duplex mode for sidelink communications based at least in part on the upper layer at the UE receiving a threshold number of consecutive in-sync indications.

Example 12: The method of any one of examples 1 through 11, wherein the UE comprises a first UE, the method further comprising: transmitting, to a second UE after switching to the half-duplex mode, an indication that the first UE is operating in the half-duplex mode for sidelink communications.

Example 13: The method of any one of examples 1 through 12, wherein the UE comprises a first UE, the method further comprising: receiving, from a second UE, an indication of whether the second UE is operating in the full-duplex mode or the half-duplex mode for sidelink communications; and scheduling sidelink communications with the second UE based at least in part on whether the second UE is operating in the full-duplex mode or the half-duplex mode.

Example 14: The method of any one of examples 1 through 13, wherein the UE comprises a first UE, the method further comprising: transmitting, to a second UE, an indication of a slot pattern used by the first UE for sidelink communication.

Example 15: The method of any one of examples 1 through 14, wherein the UE comprises a first UE, the method further comprising: receiving, from a second UE, an indication of a slot pattern used by the second UE for sidelink communications; and scheduling sidelink communications with the second UE based at least in part on the slot pattern used by the second UE for sidelink communications.

Example 16: The method of any one of examples 1 through 15, further comprising: transmitting, to a base station, a request to operate in the half-duplex mode based at least in part on the level of interference satisfying the interference threshold; and receiving a reconfiguration message from the base station configuring the UE to operate in the half-duplex mode, wherein falling back to the half-duplex mode for sidelink communications is based at least in part on receiving the reconfiguration message.

Example 17: The method of any one of examples 1 through 16, further comprising: forwarding, to a base station, a channel state information report received from a second UE; and receiving, from the base station, an indication of whether to operate in the full-duplex mode or the half-duplex mode for sidelink communications based at least in part on forwarding the channel state information report.

Example 18: The method of any one of examples 1 through 17, further comprising: receiving a control message from a base station indicating the resources allocated for interference measurements.

Example 19: The method of any one of examples 1 through 18, wherein the resources allocated for interference measurements are periodic.

Example 20: The method of any one of examples 1 through 19, wherein operating in full-duplex mode comprises simultaneously transmitting and receiving on a same set of time and frequency resources, and wherein operating in half-duplex mode comprises either transmitting or receiving on a set of time and frequency resources.

Example 21: A method for wireless communications at a base station, comprising: transmitting, to a first UE, a control message indicating resources allocated for interference measurements; identifying whether the first UE is operating in a full-duplex mode or a half-duplex mode for sidelink communications based at least in part on transmitting the control message; and scheduling sidelink communications between the first UE and a second UE based at least in part on the identifying.

Example 22: The method of example 21, further comprising: receiving, from the first UE, a request to operate in a full-duplex mode or a half-duplex mode; and transmitting, to the first UE, a reconfiguration message configuring the UE to operate in the full-duplex mode or the half-duplex mode, wherein identifying whether the first UE is operating in the full-duplex mode or the half-duplex mode for sidelink communications is based at least in part on transmitting the reconfiguration message.

Example 23: The method of any one of examples 21 or 22, further comprising: receiving, from the first UE, a channel state information report forwarded from the second UE; and transmitting, to the first UE, an indication of whether to operate in the full-duplex mode or the half-duplex mode for sidelink communications based at least in part on the channel state information report, wherein identifying whether the first UE is operating in the full-duplex mode or the half-duplex mode for sidelink communications is based at least in part on transmitting the indication.

Example 24: The method of any one of examples 21 through 23, wherein the resources allocated for interference measurements are periodic.

Example 25: An apparatus for wireless communication comprising at least one means for performing a method of any one of examples 1 through 20.

Example 26: An apparatus for wireless communication comprising a processor and memory coupled to the processor. The processor and memory may be configured to cause the apparatus to perform a method of any one of examples 1 through 20.

Example 27: A non-transitory computer-readable medium storing code for wireless communication comprising a processor, memory coupled to the processor, and instructions stored in the memory and executable by the processor to cause the apparatus to perform a method of any one of examples 1 through 20.

Example 28: An apparatus for wireless communication comprising at least one means for performing a method of any one of examples 21 through 24.

Example 29: An apparatus for wireless communication comprising a processor and memory coupled to the processor. The processor and memory may be configured to cause the apparatus to perform a method of any one of examples 21 through 24.

Example 30: A non-transitory computer-readable medium storing code for wireless communication comprising a processor, memory coupled to the processor, and instructions stored in the memory and executable by the processor to cause the apparatus to perform a method of any one of examples 21 through 24.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communication, comprising:
one or more memories; and
one or more processors coupled with the one or more memories and configured to cause the apparatus to:
receive a control message from a network entity that indicates a resource allocated for one or more interference measurements at the apparatus;
transmit on the resource allocated for the one or more interference measurements at the apparatus; and
perform a sidelink communication according to a half-duplex mode based at least in part on a switch from a full-duplex mode to the half-duplex mode and that a level of interference between a transmission and a reception at the apparatus satisfies an interference threshold.

2. The apparatus of claim 1, wherein, to transmit on the resource allocated for the one or more interference measurements, the one or more processors are configured to cause the apparatus to:
transmit a channel state information reference signal on the resource allocated for the one or more interference measurements, wherein the one or more interference measurements comprise one or more channel state information interference measurements.

3. The apparatus of claim 2, wherein the one or more processors are further configured to cause the apparatus to:
perform at least one measurement on the resource allocated for the one or more interference measurements; and
determine that the level of interference satisfies the interference threshold based at least in part on the at least one measurement performed on the resource allocated for the one or more interference measurements.

4. The apparatus of claim 3, wherein the one or more processors are further configured to cause the apparatus to:
map the at least one measurement to a block error rate; and
compare the block error rate to the interference threshold, wherein to determine that the level of interference satisfies the interference threshold is based at least in part on that the block error rate satisfies the interference threshold.

5. The apparatus of claim 1, wherein the one or more processors are further configured to cause the apparatus to:
send an out-of-sync indication from a lower layer at the apparatus to an upper layer at the apparatus each time the level of interference between the transmission and the reception at the apparatus satisfies the interference threshold.

6. The apparatus of claim 5, wherein the one or more processors are further configured to cause the apparatus to switch from the full-duplex mode to the half-duplex mode for the sidelink communication based at least in part on a threshold number of consecutive out-of-sync indications.

7. The apparatus of claim 1, wherein the one or more processors are further configured to cause the apparatus to:
send an in-sync indication from a lower layer at the apparatus to an upper layer at the apparatus each time the level of interference between the transmission and the reception at the apparatus fails to satisfy the interference threshold.

8. The apparatus of claim 7, wherein the one or more processors are further configured to cause the apparatus to:
switch back to the full-duplex mode for the sidelink communication based at least in part on a threshold number of consecutive in-sync indications.

9. The apparatus of claim 1, further comprising:
an antenna coupled with the one or more processors, wherein the one or more processors are further configured to cause the apparatus to:
transmit, to a user equipment (UE), an indication that the apparatus is in the half-duplex mode for the sidelink communication.

10. The apparatus of claim 1, wherein the one or more processors are further configured to cause the apparatus to:
receive, from a user equipment (UE), an indication of whether the UE is in the full-duplex mode or the half-duplex mode for the sidelink communication; and
schedule the sidelink communication with the UE based at least in part on whether the UE is in the full-duplex mode or the half-duplex mode.

11. The apparatus of claim 1, wherein the one or more processors are further configured to cause the apparatus to:
transmit, to a user equipment (UE), an indication of a slot pattern for the sidelink communication.

12. The apparatus of claim 1, wherein the one or more processors are further configured to cause the apparatus to:
receive, from a user equipment (UE), an indication of a slot pattern for the sidelink communication; and
schedule the sidelink communication with the UE based at least in part on the slot pattern.

13. The apparatus of claim 1, wherein the one or more processors are further configured to cause the apparatus to:
transmit, to a network entity, a request to operate in the half-duplex mode based at least in part on that the level of interference satisfies the interference threshold; and
receive a reconfiguration message from the network entity that configures the apparatus to operate in the half-duplex mode.

14. The apparatus of claim 1, wherein the one or more processors are further configured to cause the apparatus to:
transmit, to a network entity, a channel state information report received from a user equipment (UE); and
receive, from the network entity, an indication of whether to operate in the full-duplex mode or the half-duplex mode for the sidelink communication based at least in part on the transmitted channel state information report.

15. The apparatus of claim 1, wherein the resource allocated for the one or more interference measurements are periodic.

16. The apparatus of claim 1, wherein, to transmit on the resource allocated for the one or more interference measurements, the one or more processors are further configured to cause the apparatus to:
transmit a data packet on the resource allocated for the one or more interference measurements.

17. The apparatus of claim 16, wherein the one or more processors are further configured to cause the apparatus to:
decode the data packet, wherein the one or more processors are further configured to cause the apparatus to determine that the level of interference satisfies the interference threshold that is based at least in part on the decoded data packet.

18. An apparatus for wireless communication, comprising:
one or more memories; and
one or more processors coupled with the one or more memories and configured to cause the apparatus to:
transmit a control message that indicates a resource allocated for one or more interference measurements; and
schedule a sidelink communication between a first user equipment (UE) and a second UE based at least in part on whether the first UE operates in a full-duplex mode or a half-duplex mode for the sidelink communication.

19. The apparatus of claim 18, wherein the one or more processors are further configured to cause the apparatus to:
receive, from the first UE, a request to operate in the full-duplex mode or the half-duplex mode; and
transmit, to the first UE, a reconfiguration message that configures the first UE to operate in the full-duplex mode or the half-duplex mode based at least in part on the request.

20. The apparatus of claim 18, wherein the one or more processors are further configured to cause the apparatus to:
receive, from the first UE, a channel state information report forwarded from the second UE; and
transmit, to the first UE, an indication of whether to operate in the full-duplex mode or the half-duplex mode for the sidelink communication based at least in part on the channel state information report.

21. The apparatus of claim 18, wherein the resource allocated for the one or more interference measurements are periodic.

22. A method for wireless communication at a first user equipment (UE), comprising:
receiving a control message from a network entity that indicates a resource allocated for one or more interference measurements at the first UE;
transmitting on the resource allocated for the one or more interference measurements at the first UE; and
performing a sidelink communication according to a half-duplex mode based at least in part on a switch from a full-duplex mode to the half-duplex mode and that a level of interference between a transmission and a reception at the first UE satisfies an interference threshold.

23. The method of claim 22, the transmitting comprising:
transmitting a channel state information reference signal on the resource allocated for the one or more interference measurements, wherein the one or more interference measurements comprise one or more channel state information interference measurements.

24. The method of claim 23, further comprising:
performing at least one measurement on the resource allocated for the one or more interference measurements; and
determining that the level of interference satisfies the interference threshold based at least in part on the at least one measurement performed on the resource allocated for the one or more interference measurements.

25. The method of claim 24, further comprising:
mapping the at least one measurement to a block error rate; and
comparing the block error rate to the interference threshold, wherein determining that the level of interference satisfies the interference threshold is based at least in part on that the block error rate satisfies the interference threshold.

26. The method of claim 22, further comprising:
transmitting, to a second UE, an indication that the first UE is in the half-duplex mode for the sidelink communication.

27. The method of claim 22, further comprising:
receiving, from a second UE, an indication of whether the second UE is in the full-duplex mode or the half-duplex mode for the sidelink communication; and
scheduling the sidelink communication with the second UE based at least in part on whether the second UE is in the full-duplex mode or the half-duplex mode.

28. The method of claim 22, the transmitting comprising:
transmitting a data packet on the resource allocated for the one or more interference measurements.

29. The method of claim 28, further comprising:
decoding the data packet, wherein determining that the level of interference satisfies the interference threshold is based at least in part on decoding the data packet.

30. A method for wireless communication at a network entity, comprising:
transmitting a control message that allocates a resource for one or more interference measurements; and
scheduling a sidelink communication between a first user equipment (UE) and a second UE based at least in part on whether the first UE operates in a full-duplex mode or a half-duplex mode for the sidelink communication.

31. The method of claim 30, further comprising:
receiving, from the first UE, a request to operate in the full-duplex mode or the half-duplex mode; and
transmitting, to the first UE, a reconfiguration message that configures the first UE to operate in the full-duplex mode or the half-duplex mode based at least in part on the request.

32. The method of claim 30, further comprising:
receiving, from the first UE, a channel state information report forwarded from the second UE; and
transmitting, to the first UE, an indication of whether to operate in the full-duplex mode or the half-duplex mode for the sidelink communication based at least in part on the channel state information report.

33. The method of claim 30, wherein the resource allocated for the one or more interference measurements are periodic.

34. An apparatus for wireless communication, comprising:
receiving a control message from a network entity that indicates a resource allocated for one or more interference measurements at the apparatus;
means for transmitting on the resource allocated for the one or more interference measurements at the apparatus; and
means for performing a sidelink communication according to a half-duplex mode based at least in part on a switch from a full-duplex mode to the half-duplex mode and that a level of interference between a transmission and a reception at the apparatus satisfies an interference threshold.

* * * * *